(12) United States Patent
Dhawan et al.

(10) Patent No.: US 11,295,131 B1
(45) Date of Patent: Apr. 5, 2022

(54) SMOKE AND FIRE RECOGNITION, FIRE FORECASTING, AND MONITORING

(71) Applicant: KNOETIK SOLUTIONS, INC., North Potomac, MD (US)

(72) Inventors: Kian Dhawan, North Potomac, MD (US); Kyra Dhawan, North Potomac, MD (US)

(73) Assignee: KNOETIK SOLUTIONS, INC., North Potomac, MD (US)

( * ) Notice: Subject to any disclaimer, the term of this patent is extended or adjusted under 35 U.S.C. 154(b) by 0 days.

(21) Appl. No.: 17/347,821

(22) Filed: Jun. 15, 2021

(51) Int. Cl.
| | |
|---|---|
| G06K 9/00 | (2006.01) |
| G06N 3/08 | (2006.01) |
| G05B 13/02 | (2006.01) |
| G06K 9/32 | (2006.01) |
| G06K 9/62 | (2006.01) |
| G08G 5/00 | (2006.01) |
| G08B 17/00 | (2006.01) |
| G06K 9/46 | (2006.01) |
| H04L 29/08 | (2006.01) |
| H04L 67/12 | (2022.01) |

(52) U.S. Cl.
CPC ....... *G06K 9/00657* (2013.01); *G05B 13/027* (2013.01); *G06K 9/3241* (2013.01); *G06K 9/4609* (2013.01); *G06K 9/6229* (2013.01); *G06K 9/6257* (2013.01); *G06K 9/6268* (2013.01); *G06N 3/08* (2013.01); *G08B 17/005* (2013.01); *G08G 5/0043* (2013.01); *H04L 67/12* (2013.01)

(58) Field of Classification Search
None
See application file for complete search history.

(56) References Cited

U.S. PATENT DOCUMENTS

| | | |
|---|---|---|
| 6,556,981 B2 | 4/2003 | Pedersen et al. |
| 10,330,624 B2 | 1/2019 | Tayebi et al. |
| 10,299,101 B1 * | 5/2019 | Lim ............... G08B 7/066 |

(Continued)

FOREIGN PATENT DOCUMENTS

| | | |
|---|---|---|
| IN | 202011051493 | 12/2020 |
| KR | 20040080664 A | 9/2004 |
| KR | 101869442 B1 | 6/2018 |

OTHER PUBLICATIONS

Kinaneva, Diyana, et al. "Early forest fire detection using drones and artificial intelligence." 2019 42nd International Convention on Information and Communication Technology, Electronics and Microelectronics (MIPRO). IEEE, 2019. (Year: 2019).*

*Primary Examiner* — David Perlman
(74) *Attorney, Agent, or Firm* — Dave Law Group LLC; Raj S. Dave

(57) ABSTRACT

A method and system to receive, one or more first images, one or more second images, one or more ambient weather related information, and one or more land related information, wherein the one or more land related information comprise vegetation features, terra firma topography, elevation, slope and aspect, of one or more regions of interest, of a geographical region; to map automatically, one or more risk areas of the one or more regions of interest; to recognize automatically, one or more smoke or fire related signals; and to predict computationally, existence of a fire causing smoke, a fire, a fire-growth and spread.

17 Claims, 14 Drawing Sheets

(56) References Cited

U.S. PATENT DOCUMENTS

| | | | |
|---|---|---|---|
| 10,854,062 | B2 | 12/2020 | Ebata |
| 2005/0100193 | A1 | 5/2005 | Privalov |
| 2006/0006997 | A1 | 1/2006 | Rose-Pehrsson et al. |
| 2012/0261144 | A1 | 10/2012 | Vian et al. |
| 2013/0134254 | A1 | 5/2013 | Moore |
| 2015/0204725 | A1 | 7/2015 | Huseynov et al. |
| 2015/0339912 | A1* | 11/2015 | Farrand ................ G08B 25/008 340/501 |
| 2018/0018358 | A1 | 1/2018 | Birdwell et al. |
| 2018/0336452 | A1* | 11/2018 | Tschernezki ......... G06N 3/0454 |
| 2019/0279447 | A1* | 9/2019 | Ricci ....................... B60R 25/00 |
| 2020/0159397 | A1* | 5/2020 | Tohidi ................. G06F 3/04845 |
| 2020/0317338 | A1 | 10/2020 | Wang |
| 2021/0192175 | A1* | 6/2021 | Pineda ................. G06K 9/0063 |
| 2021/0192629 | A1* | 6/2021 | Tofte ......................... G06T 7/75 |

\* cited by examiner ized wild-area wildland fires. The invention more particularly is concerned with a method and an improved

SMOKE AND FIRE RECOGNITION, FIRE FORECASTING, AND MONITORING

FIELD OF THE INVENTION

This invention relates generally to a system and method for tracking large-area wildland fires. The invention more particularly is concerned with a method and an improved firefighting system for smoke recognition, fire forecasting, and monitoring fire growth.

BACKGROUND

"Nearly 85 percent of wildland fires in the United States are caused by humans. Human-caused fires result from campfires left unattended, the burning of debris, equipment uses and malfunctions, negligently discarded cigarettes, and intentional acts of arson." [Source: 2000-2017 data based on Wildland Fire Management Information (WFMI) and U.S. Forest Service Research Data Archive]

"The integrated fire detection and fighting systems and methods of the present invention use earth satellites, piloted and drone aircraft and fixed mount cameras to periodically generate and capture images of selected geographic regions. The video images are computer analyzed to detect and precisely locate a fire at its earliest stages. Computer image analysis is used to fully characterize the fire, such as identifying its extent, intensity, flame fronts and rate of growth, etc. Expert system computers based on fuzzy logic rules analyze all known variables important to determining a firefighting strategy." [Source: Fire detection systems and methods; Robert D. Pedersen Jerome and H. Lemelson; issued as U.S. Pat. No. 6,556,981B2 on 29 Apr. 2003.]

"One method includes an operation for accessing values of features for monitoring a fire in a region. The features include satellite images at a first resolution, vegetation information, and weather data." [Source: Fire monitoring; Ali Tohidi, Nicholas Mccarthy Yawar Aziz, Nicole Hu, Ahmad Wani, Timothy Frank; published as US2020159397A1 on 21 May 2020].

"Satellite images are used to monitor the fire. The cells of the fire monitoring map have higher resolution than the satellite images, and a machine-learning tool is used to improve the resolution provided by the satellite images by combining the image information with additional fire-related data (e.g., weather data, vegetation data, etc.)." [Source: Fire management tool with versatile user interface; Ali Tohidi, Nicholas Mccarthy Yawar Aziz, Nicole Hu, Ahmad Wani, Timothy Frank; published as US20200159397A1 on 21 May 2020.]

"Satellites may be used to provide information about infrared radiation that may be emitted by fires. Although satellites are useful, these types of satellites may have a short window of observation. Additionally, cloud cover and image resolution also may limit the effectiveness of these types of systems. Use of aircraft with sensors configured to detect fires also provides an additional method for detecting fires. Aircraft, however, may be limited in range and/or conditions in which they are capable of detecting fires." [Source: Fire Management System; Boeing Co; published as US20120261144A1 on 18 Oct. 2012.]

"A system and method for tracking the growth of large-area wildland fires. The technique includes monitoring wind conditions in and around a wildfire using near-surface-sited sensors deployed by a high-altitude long-endurance (HALE) unmanned aerial vehicle (UAV), such as the Global Hawk. The deployed sensors measure a localized wind vector at multiple locations within and surrounding the wildfire and transmit the wind data back to the UAV for relaying to a command center operated by fire management authorities, where the wind data are used to assist decision-making, including as input into wildfire growth prediction models." [Source: UAVs for tracking the growth of large-area wildland fires; Northrop Grumman Systems Corp; published as U.S. Pat. No. 9,977,963B1 on 22 May 20180].

"A UAV loaded onto a transport aircraft and carried near a fire area, at which point the UAV is launched and releases fire extinguishing or fire-retardant material from the UAV onto the fire or anticipated fire path. [Source: System and Method for Extinguishing Wildfires; Hoffman; published as US20090205845A1 on Aug. 20, 2009].

"An airborne vehicle equipped with an extinguishant container that is deployed and detonated over a fire." [Source: Airborne Vehicle for Firefighting; by Setzer; issued as U.S. Pat. No. 7,121,353B2 on 17 Oct. 2006].

"A UAV fire-fighting system, an unmanned aerial vehicle (UAV) designed to extinguish fires from the air while remaining tethered to the ground via a tether system fashioned to provide the UAV with power and extinguishant." [Source: UAV Fire-fighting System; Jason Moore; published as US20130134254A1 on 30 May 2013].

"A firefighting drone programmed through machine learning and establish communication through IoT which reduces the spread of fire and extinguish automatically". [Source: An IOT based autonomous firefighting drone through machine learning; Lovely Professional University, Published as IN202011051493 on 4 Dec. 2020].

"Cascade classification model using a Convolutional Neural Network (CNN) for detecting a fire by distinguishing between smoke and non-smoke objects. U.S. Ser. No. 10/854,062B2 describes use of multi-layer-type neural network by dividing captured images from region being monitored is into a plurality of block images to detect a fire." [Source: Fire detecting apparatus and the method thereof; NAT UNIV KONGJU IND UNIV COOP FOUND; issued as KR101869442B1 on 20 Jun. 2018].

"Future studies could incorporate other explanatory variables (e.g., vegetation type and density, wind speed and direction, and different types of socio-economic factors and drought indices) into the modeling process in favor of better explaining fire behavior" [Source: Performance Evaluation of Machine Learning Methods for Forest Fire Modeling and Prediction; Phem et. al.; Symmetry 2020, 12(6), 1022].

"Fire managers must manage risk and uncertainty while minimizing decision biases to improve the safety and effectiveness of large-fire response. Decision support systems support risk-informed decision making and can provide an objective means for analyzing response options, monitoring decisions and outcomes, and documenting the decision process for future learning." [Source: A framework for developing safe and effective large-fire response in a new fire management paradigm; C. J. Dunn et. al.; Forest Ecology and Management. 404: 184-196 2017].

"A fire detector using an electronic nose sensor is provided to minimize the damage by performing early suppression and looking into causes of the fire. CONSTITUTION: A fan motor(10) includes a suction part(12) for collecting air. A sensor array(20) includes a plurality of sensors in order to identify a predetermined pattern of a smell through the suction unit. A detector/amplifier(30) changes the identified smell as data and detects and amplifies data signals of the identified smell. An A/D converter(40) is used for converting the detected data signals to electric signals. A storage unit(50) stores various patterns of fire smells as reference values. A display(60) is used for displaying present states of the sensors. An alarm(70) is used for alarming a fire according to a contact state of a relay. A microcomputer(80) controls the fan motor and the display, determines a state of the fire by comparing the detected signal pattern with the stored reference values, and adjusts the contact of the relay." Source: FIRE DETECTOR USING ELECTRONIC NOSE SENSOR, IN WHICH PREVIOUS ALARM IS EASILY REALIZED; SHIN HWA ELECTRONICS CO LTD; filed as KR20040080664A on 12 Mar. 2003].

"Invention aspects relate to devices and systems having a low power, high sensitivity array of MOS sensor pixels that can simultaneously and selectively detect chemical reactions involving one or more analytes and a reactant, such as adsorbed oxygen molecules, at the MOS active materials of the sensor pixels. Such reactions cause changes in the electrical resistance of the MOS active material, thereby providing accurate concentrations of the analyte or analytes." [Source: Metal oxide gas sensor array devices, systems, and associated methods; INTEL CORP [US]; issued as U.S. Ser. No. 10/330,624B2 on 25 Jun. 2019].

"This paper develops a new fire risk prediction method based on mining the association rules in the time domain. Firstly, an evaluation index system for fire risk was constructed after analyzing the risk of disaster-causing factors and the ability of disaster-reducing factors. Then, the spatiotemporal DB SCAN algorithm was designed to adapt to the historical fire data involving both time and space dimensions. Experimental results prove the superiority of the algorithm in response speed under different computing loads. In addition, the TDP-based association rule mining algorithm was introduced to quantitatively evaluate fire risk, and improved by the MapReduce process. Finally, the improved algorithm was applied to mine the association rules between evaluation indices and fire occurrence, and compared with the FP-tree mining and Apriori algorithm in prediction error." [Source: Xiaoying Zhang, Prediction of fire risk based on cloud computing, Alexandria Engineering Journal, Volume 60, Issue 1, 2021, Pages 1537-1544]

Considering the knowledge of persons skilled in the art, there is a long-felt need to address the shortcomings in the prior art and provide a system that is capable of quick and powerful recognition and can identify fires in an early stage and anticipate the transmission of forest fires and wildfires before it turns the landscape into a blazing inferno, by developing a system. It would be advantageous to have a method and apparatus that considers at least some of the issues discussed above, as well as possibly other issues.

SUMMARY

The present disclosure describes one or more aspects of risk area mapping, recognizing smoke and fire related signals, predicting existence of a fire causing smoke, a fire, fire-growth and spread and volumetric analysis for performing risk mitigation analysis, decision making and generating warning signals to control fire at an early stage.

In an aspect, a method is described herein. The method comprising: receiving, one or more first images, one or more second images, one or more ambient weather related information, and one or more land related information, wherein the one or more land related information comprise vegetation features, terra firma, topography, elevation, slope and aspect, of one or more regions of interest, of a geographical region; mapping automatically, one or more risk areas of the one or more regions of interest, from the one or more first images of the one or more regions of interest; recognizing automatically, one or more smoke or fire related signals from the one or more second images and the one or more ambient weather related information; and predicting automatically, existence of a fire causing smoke, a fire, fire-growth and spread based on the one or more second images, the one or more ambient weather related information of the one or more regions of interest and the one or more land related information.

In an embodiment, the mapping, the recognizing and the predicting is performed by at least one of a statistical analysis, a machine learning algorithm comprising a deep-neural network, an artificial intelligence platform, a rule-based analysis, and a risk-based analysis.

In another embodiment, the statistical analysis, the machine learning algorithm, the artificial intelligence platform, the rule-based analysis, and the risk-based analysis execute on a cloud-computing platform.

In yet another embodiment, the cloud-computing platform executes on information processed by a fog network and/or one or more edge devices.

In yet another embodiment, the one or more first images, the one or more second images and the one or more ambient weather related information are obtained using a plurality of self-steering unmanned aerial devices.

In another embodiment, the method further comprises obtaining geolocation of the one or more risk areas.

In yet another embodiment, the mapping automatically, the one or more risk areas from the one or more first images, comprises extracting with the deep-neural network executing on a processor, an arid vegetation land, a semi-arid vegetation land, an arid vegetation land with active human interference, an arid vegetation land with dry lightning and data on past fire history of the one or more regions of interest.

In yet another embodiment, the one or more first images and the one or more second images are processed by a convolutional neural network.

In yet another embodiment, the one or more first images, and the one or more second images are processed as tensors.

In yet another embodiment, recognizing automatically, using the deep-neural network, the one or more smoke or fire related signals comprise: extracting, using a convolutional neural network executing on a processor operably coupled to plurality of sensors, a convolutional output; generating, with a non-linear regression model operably coupled to the deep-neural network, a time-series pattern representation of the one or more smoke or fire related signals; classifying, with a classifier operably coupled to the deep-neural network, the one or more smoke or fire related signals based on the convolutional output; and identifying, start of the fire by time series correlation, of the classified the one or more smoke or fire related signals and the time-series pattern representation.

In yet another embodiment, the convolutional output comprises a smoke, a flame, a spark, and an ember.

In yet another embodiment, the one or more smoke or fire related signals comprise a smoke, a flame, a spark, an ember, a rapid rise in surface temperature, increase in surface heat and increase in Carbon Dioxide ($CO_2$) level.

In yet another embodiment, the method further comprises annotating the one or more second images using a visual combustible object tagging tool to specify bounding boxes around edges of the one or more smoke or fire related signals.

In yet another embodiment, annotating the one or more second images comprises: processing, the one or more second images, through a plurality of filters to create map edges of the one or more smoke or fire related signals; performing, combustible object recognition within given scenes by slicing and indexing the one or more second images using a N-dimensional array mapping method; and identifying, by time-correlation analysis, cause, precise geo-location, and timestamp of start of the fire.

In yet another embodiment, the plurality of filters comprise a horizontal line filter, a vertical line filter, and a diagonal line filter.

In yet another embodiment, the one or more first images, and the one or more second images comprise still-images, videos, and infrared images.

In yet another embodiment, the predicting automatically the existence of the fire, the fire-growth and the spread comprises extracting, one or more fire characteristics from the one or more second images, and the one or more land related information; predicting computationally, using the deep-neural network, the fire-growth and the spread; and providing information for situational awareness and decision making based on the fire-growth and the spread prediction.

In yet another embodiment, the method further comprises generating a risk mitigation report from the provided information for situational awareness and decision making.

In yet another embodiment, extracting the one or more fire characteristics comprise extracting timestamp of start of the fire, size of the fire, rate of spread, intensity of the fire, presence of fire whirls, ember production, spotting, soil heating, temperature, heat output of surface, fuel moisture, the topography, ignition method, air temperature, wind speed, wind direction and relative humidity.

In yet another embodiment, the receiving occurs via a high-speed broadband internet network.

In yet another embodiment, the high-speed broadband internet network comprises a 5G network and a next generation Wi-Fi network.

In yet another embodiment, the one or more first images are obtained from the one or more regions of interest of the geographical region and the one or more second images are obtained from the one or more risk areas mapped from the one or more regions of interest.

In yet another embodiment, the geographical region comprises a forest, a mountain, a grassland, a farmland, a desert, a hill, a peat land, a prairie area, a valley, and a veld.

In yet another embodiment, the one or more ambient weather related information comprise wind speed, wind direction, humidity, temperature, wind pattern, lightning, and season.

In yet another embodiment, the method further comprises training the deep-neural network, to automatically map the one or more risk areas of the one or more regions of interest using the one or more first images of the one or more regions of interest, the land related information, the one or more ambient weather related information, the one or more risk areas, one or more reference risk areas, and one or more mapped risk areas.

In yet another embodiment, the method further comprises training the deep-neural network, to automatically recognize, the one or more smoke or fire related signals from the one or more second images of the one or more risk areas and the one or more ambient weather related information, using the one or more smoke or fire related signals, the one or more first images, the one or more second images, the one or more land related information, the one or more ambient weather related information, the one or more risk areas, one or more reference smoke related signals, one or more reference fire related signals, and one or more mapped risk areas.

In yet another embodiment, the method further comprises training the deep-neural network, to automatically predict the existence of the fire, the fire-growth and the spread using the one or more second images, the one or more ambient weather related information, of the one or more regions of interest, the one or more land related information, one or more reference fire characteristics and one or more reference fire spread profile.

In yet another embodiment, the method further comprises machine-learning or relearning by executing one or more machine-learning algorithms, wherein one of the machine-learning algorithms comprises an evolutionary algorithm.

In another aspect, a method is described herein. The method comprises: sending, by a plurality of self-steering unmanned aerial devices, one or more images of one or more regions of interest for a geographical region, one or more ambient weather related information, and one or more land related information, wherein the one or more land related information comprise vegetation features, terra firma, topography, elevation, slope and aspect, for the geographical region, to a server, receiving, by the plurality of self-steering unmanned aerial devices a relocation instruction, from the server, of a geolocation; and sending periodically, by the plurality of self-steering unmanned aerial devices, one or more second images of the geolocation, to the server.

In one embodiment, the server can be on a cloud-computing platform, a fog network and/or one or more edge devices.

In yet another aspect, a method is described herein. The method comprises: obtaining periodically, one or more first images, of one or more regions of interest, of a geographical region; obtaining, one or more ambient weather related information, of the one or more regions of interest; obtaining, one or more land related information, wherein the one or more land related information comprise vegetation features, terra firma, topography, elevation, slope and aspect for the geographical region; obtaining; mapping automatically, using a deep-neural network, one or more risk areas, of the one or more regions of interest, from the one or more first images of the one or more regions of interest; obtaining periodically, one or more second images, of the one or more risk areas, mapped from the one or more first images, of the one or more regions of interest; recognizing automatically, using the deep-neural network, one or more smoke or fire related signals, from the one or more second images and the one or more ambient weather related information; and predicting automatically, using the deep-neural network, existence of a fire causing smoke, a fire, fire-growth and spread, based on the one or more second images, the one or more ambient weather related information of the one or more regions of interest and the one or more land related information.

In an embodiment, the method further comprises obtaining data on past fire history of the one or more regions of interest.

In another embodiment, the one or more first images, the one or more second images, and the one or more ambient weather related information, are obtained by a plurality of self-steering unmanned aerial devices.

In yet another embodiment, the one or more first images, the one or more second images, and the one or more ambient weather related information, are obtained via a high-speed broadband internet network.

In yet another embodiment, the method further comprises generating warning signals on possible start of the fire.

In yet another embodiment, the generated warning signal is sent to one or more relevant authorities, a fire department, a fire service station, and a brigade.

In yet another aspect, a system is described herein. The system comprises a server comprising a processor, a memory, a communication device, a database, wherein the server is: receiving, one or more first images, one or more second images, one or more ambient weather related information, and one or more land related information, wherein the one or more land related information comprise vegetation features, terra firma, topography, elevation, slope and aspect, of one or more regions of interest, of a geographical region; mapping automatically, using a deep-neural network, one or more risk areas, of the one or more regions of interest, from the one or more first images, of the one or more regions of interest; recognizing automatically, using the deep-neural network, one or more smoke or fire related signals, from the one or more second images and the one or more ambient weather related information; and predicting automatically, using the deep-neural network, existence of a fire causing smoke, a fire, fire-growth and spread based on the one or more second images, the one or more ambient weather related information, of the one or more regions of interest, and the one or more land related information.

In an embodiment, the system is further operable to obtain data on past fire history of the one or more regions of interest for mapping.

In another embodiment, the processor comprises a graphical processing unit (GPU) and a central processing unit (CPU).

In yet another aspect, a system is described herein. The system comprises a plurality of self-steering unmanned aerial devices (UAVs), comprising a UAV processor, a UAV memory, a UAV communication device, a UAV database; wherein the UAVs are configured for: sending, one or more first images, of one or more regions of interest, for a geographical region, one or more ambient weather related information, and one or more land related information to a server, wherein the one or more land related information comprise vegetation features, terra firma, topography, elevation, slope and aspect, for the geographical region, to the server; receiving, a relocation instruction, from the server, of a geolocation; and sending periodically, one or more second images, of the geolocation, to the server.

In an embodiment, the sending and receiving occurs via a high-speed broadband internet network.

In yet another embodiment, the system further comprises a geolocation device and plurality of sensors comprising a high-definition camera, an audio sensor, a heat sensor, a temperature sensor, a wind speed sensor, a smell sensor, a smoke sensor, a $CO_2$ sensor, a wind direction sensor, a humidity sensor, an atmospheric pressure sensor, a solar radiation sensor and a lightning detector.

In yet another aspect, a system is described herein. The system comprises a plurality of self-steering unmanned aerial devices (UAVs), comprising a UAV processor, a UAV memory, a UAV communication device, a UAV database and a server that comprises a processor, a second memory, a second communication device, a second database, wherein the system is operable for: obtaining periodically, one or more first images, of one or more regions of interest, of a geographical region, using the plurality of self-steering unmanned aerial devices; obtaining, one or more ambient weather related information of the one or more regions of interest; obtaining, one or more land related information, wherein the one or more land related information comprise vegetation features, terra firma, topography, elevation, slope and aspect for the geographical region; mapping automatically, using a deep-neural network, one or more risk areas, of the one or more regions of interest, from the one or more first images, of the one or more regions of interest; obtaining periodically, one or more second images, of the one or more risk areas, mapped from the one or more first images, of the one or more regions of interest, using the plurality of self-steering unmanned aerial devices; recognizing automatically, using the deep-neural network, one or more smoke or fire related signals, from the one or more second images, and the one or more ambient weather related information; and predicting automatically, and the deep-neural network, existence of a fire causing smoke, a fire, fire-growth and spread based on the one or more second images, the one or more ambient weather related information, of the one or more regions of interest, and the one or more land related information.

In an embodiment, the system is further operable to obtain data on past fire history of the one or more regions of interest.

In another embodiment, the plurality of self-steering unmanned aerial devices are controlled by a ground-based controller.

In yet another embodiment, the ground-based controller comprises an Internet of Things based device management system (IoT).

In yet another embodiment, the obtaining occurs via a high-speed broadband internet network.

In yet another aspect, a database is described herein. The database comprises a) one or more first images, of one or more regions of interest, of a geographical region; b) one or more ambient weather related information of the one or more regions of interest; c) one or more land related information, wherein the one or more land related information comprise vegetation features, terra firma, topography, elevation, slope and aspect for the geographical region; d) data on past fire history, of the one or more regions of interest; e) one or more risk areas, of the one or more regions of interest, mapped from the one or more first images; f) one or more second images, of the one or more risk areas; e) one or more smoke or fire related signals; f) one or more fire characteristics; and g) an index, for identification of risk areas, identification of existence of a fire causing smoke, a fire, and prediction of fire-growth and spread.

In an embodiment, the database is on a cloud-computing platform.

In yet another aspect, a non-transitory computer storage medium is described herein. The non-transitory computer storage medium stores a sequence of instructions, which when executed by a processor, causes: receiving, one or more first images, one or more second images, one or more ambient weather related information, and one or more land related information, wherein the one or more land related information comprise vegetation features, terra firma, topography, elevation, slope and aspect, of one or more regions of interest, of a geographical region; mapping automatically, one or more risk areas of the one or more regions of interest, from the one or more first images of the one or more regions of interest; recognizing automatically, one or more smoke or fire related signals from the one or more second images and the one or more ambient weather related information; and predicting automatically, existence of a fire causing smoke, a fire, fire-growth and spread based on the one or more second images, the one or more ambient weather related information of the one or more regions of interest and the one or more land related information.

In another embodiment, the non-transitory computer storage medium further stores computer readable instructions and one or more machine-learning algorithms wherein one of the machine-learning algorithms comprises an evolutionary algorithm.

BRIEF DESCRIPTION OF THE FIGURES

In the present disclosure, reference is made to the accompanying drawings, which form a part hereof. In the drawings, similar symbols typically identify similar components, unless context dictates otherwise. Various embodiments described in the detailed description, and drawings, are illustrative and not meant to be limiting. Other embodiments may be used, and other changes may be made, without departing from the spirit or scope of the subject matter presented herein. It will be understood that the aspects of the present disclosure, as generally described herein, and illustrated in the Figures, can be arranged, substituted, combined, separated, and designed in a wide variety of different configurations, all of which are contemplated herein. The embodiments are illustrated by way of example and not limitation in the figures of the accompanying drawings, in which like references indicate similar elements and in which.

DETAILED DESCRIPTION

Definitions and General Techniques

Figure 1A:
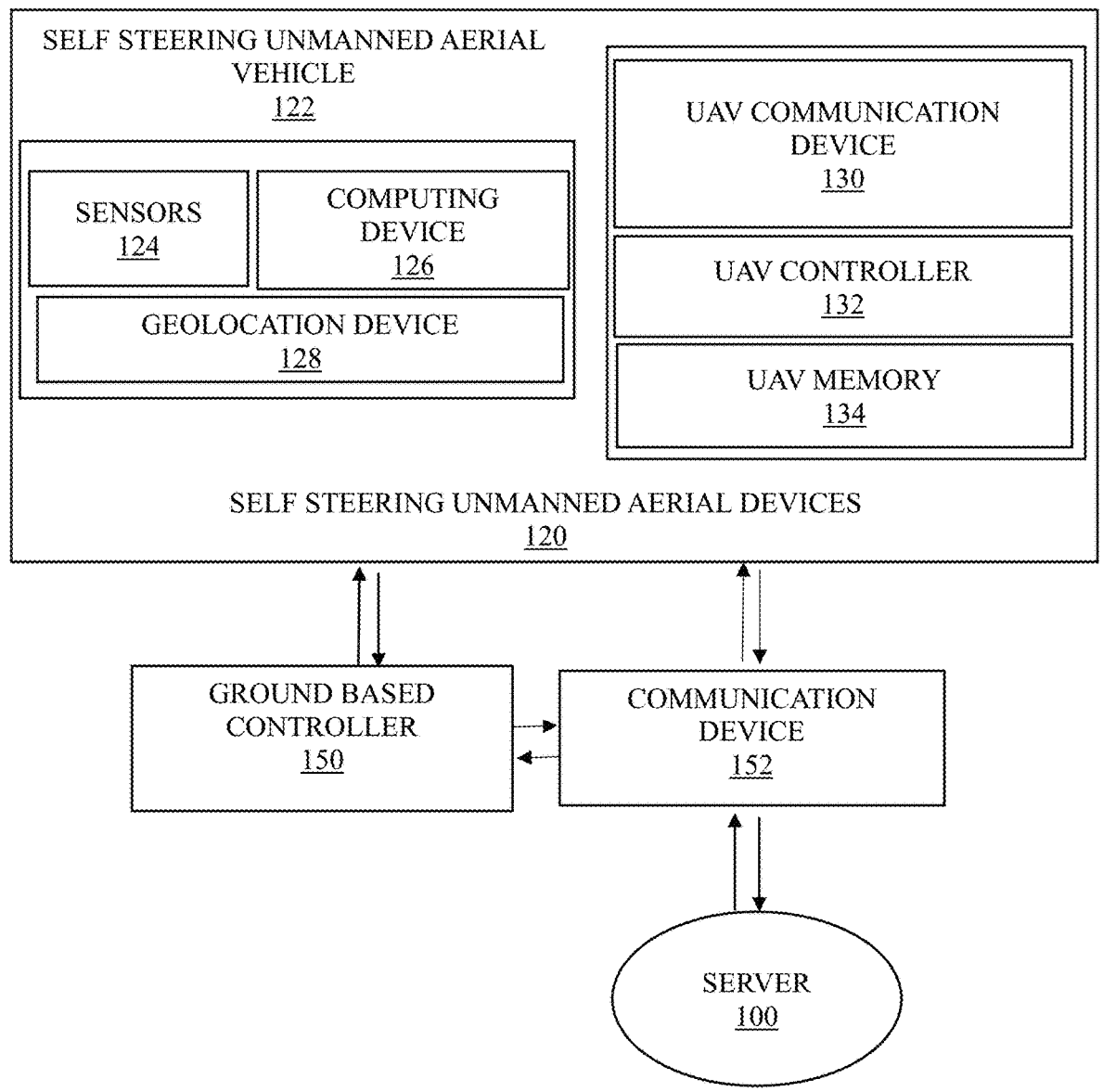
FIGS. 1A-1B illustrate a schematic and functional view of a smoke and fire recognition, forecasting, and monitoring system, according to one or more embodiments.

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only and is not intended to be limiting. Unless defined otherwise, all technical and scientific terms used herein have the same meaning as commonly understood by one of ordinary skill in the art to which this disclosure belongs.

The articles "a" and "an" are used herein refers to one or to more than one (i.e., to at least one) of the grammatical object of the article. By way of example, "an element" means one element or more than one element.

No element, act, or instruction used herein should be construed as critical or essential unless explicitly described as such. Also, as used herein, the articles "a" and "an" are intended to include items and may be used interchangeably with "one or more." Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open-ended term in this written description, like "comprising" or "including," it is understood that direct support should also be afforded to "consisting essentially of" language as well as "consisting of" language as if stated explicitly and vice versa.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Reference throughout this specification to "an example", "an instance", "for example" means that a particular feature, structure, or characteristic described in connection with the example is included in at least one embodiment. Thus, appearances of the phrases "in an example" in various places throughout this specification are not necessarily all referring to the same embodiment.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing device" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, for example without limitation, a Programmable Logic Controller (PLC), a Field Programmable Gate Array (FPGA), an Application Specific Integrated Circuit (ASIC), Application-Specific Standard Products (ASSPs), System-On-a-Chip systems (SOCs), Complex Programmable Logic Devices (CPLDs), etc.

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, flash memory devices, magnetic disks, e.g., internal hard disks or removable disks, magneto optical disks, CD ROM and DVD-ROM disks and solid state disks. The processor and the memory may be supplemented by, or incorporated in, special purpose logic circuitry.

To provide for interaction with a user, implementations may be realized on a computer having a display device, e.g., a Cathode Ray Tube (CRT) or Liquid Crystal Display (LCD) monitor, for displaying information to the user and a keyboard and a pointing device, e.g., a mouse or a trackball, by which the user may provide input to the computer. Other kinds of devices may be used to provide for interaction with a user as well, for example, feedback provided to the user may be any appropriate form of sensory feedback, e.g., visual feedback, auditory feedback, or tactile feedback, and input from the user may be received in any appropriate form, including acoustic, speech, or tactile input.

Implementations may be realized in a computing system that includes a back end component, e.g., as a data server, or that includes a middleware component, e.g., an application server, or that includes a front-end component, e.g., a client computer having a graphical user interface or a Web browser through which a user may interact with an implementation, or any appropriate combination of one or more such back end, middleware, or front-end components. The components of the system may be interconnected by any appropriate form or medium of digital data communication, e.g., a communication network. Examples of communication networks include a Local Area Network (LAN) and a Wide Area Network (WAN), e.g., the Internet.

The computing system may include clients and servers. A client and server are generally remote from each other and typically interact through a communication network. The relationship of client and server arises by virtue of computer programs executing on the respective computers and having a client-server relationship to each other.

Embodiments of the present disclosure may comprise or utilize a special purpose or general-purpose computer including computer hardware. Embodiments within the scope of the present disclosure also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the disclosure can comprise at least two distinctly different kinds of computer-readable media: physical computer-readable storage media and transmission computer-readable media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described. Rather, the described features and acts are disclosed as example forms of implementing the claims.

Physical computer-readable storage media includes RAM, ROM, EEPROM, CD-ROM or other optical disk storage (such as CDs, DVDs, etc.), magnetic disk storage or other magnetic storage devices, solid state disks, or any other medium which can be used to store desired program code means in the form of computer-executable instructions or data structures and which can be accessed by a general purpose or special purpose computer. Some physical computer-readable storage media include Secure Digital card/microSD card, Secure Digital High-Capacity card, CompactFlash card, SmartMedia card, Memory Stick, MultiMediaCard and the xD-Picture card and more.

A "network" is defined as one or more data links that enable the transport of electronic data between computer systems and/or modules and/or other electronic devices. When information is transferred or provided over a network, such as a 5G network, or another communications connection (either hardwired, wireless, or a combination of hardwired or wireless) to a computer, the computer properly views the connection as a transmission medium. Transmission media can include a network and/or data links which can be used to carry data or desired program code means in the form of computer-executable instructions or data structures and which can be accessed by a general purpose or special purpose computer. Combinations of the above are also included within the scope of computer-readable media.

Furthermore, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in Random Access Memory (RAM) within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject is not necessarily limited to the described features or acts described above. Rather, the described features and acts are disclosed as example forms of implementing subject matter.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Even though particular combinations of features are disclosed in the specification, these combinations are not intended to limit the disclosure of possible implementations.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

An initial overview of technology embodiments is provided below, and specific technology embodiments are then described in further detail. This initial summary is intended to aid readers in understanding the technology more quickly but is not intended to identify key or essential technological features, nor is it intended to limit the scope of the claimed subject matter.

The embodiments herein and the various features and advantageous details thereof are explained more fully with reference to the non-limiting embodiments that are illustrated in the accompanying drawings and detailed in the following description.

In order to fully understand the scope of the invention, the following terms used herein are hereby defined.

As referred herein, "ambient weather" refers to the conditions of the atmosphere comprising wind speed, wind direction, humidity, temperature, wind pattern, lightning, and season over a short period of time.

As used herein, the term "cloud" refers to servers that are accessed over the Internet, and the software and databases that run on those servers. Cloud servers are located in data centers all over the world. By using cloud computing, users and companies don't have to manage physical servers themselves or run software applications on their own machines.

As referred herein, "cloud network" refers to a type of Information Technology (IT) infrastructure in which some or all of an organization's network capabilities and resources are hosted in a public or private cloud platform, managed in-house or by a service provider, and available on demand. Cloud networking resources can be used either on-premises to build a private cloud network or use cloud-based networking resources in the public cloud, or a hybrid cloud combination of both. These network resources can include virtual routers, firewalls, and bandwidth and network management software, with other tools and functions available as required.

As referred herein, an "edge device" is any piece of hardware that controls data flow at the boundary between two networks. Edge devices are pieces of equipment that serve to transmit data between the local network and the cloud.

As referred herein, "fog network" is an architecture that uses edge devices to carry out a substantial amount of computation, storage, and communication locally and routed over the Internet backbone. Fog computing, also called Edge Computing, is intended for distributed computing where numerous "peripheral" devices connect to a cloud. (The word "fog" suggests a cloud's periphery or edge). The fog network regulates which information and what amount of data should be sent to the cloud platform and which data can be processed locally.

As referred herein, "edge network" refers to a distributed computing paradigm which brings data storage and computation as close to the point of need as possible, pushing applications, data and computing power away from centralized data centers. This reduces the volumes of data that must be moved, the consequent traffic, and the distance the data must travel, providing lower latency and reduced transmission costs.

As referred herein, "cloud-computing platform" refers to the use of remote public or private computing resources—known as the cloud—to process and analyze data on demand. Cloud computing analytics helps streamline the process of gathering, integrating, analyzing, and presenting insights to enhance situational awareness and decision making.

As referred herein, "high-speed broadband internet network" refers to a high-speed, higher bandwidth connection to the Internet without a need for wired connection. The greater bandwidth of a broadband connection allows for more data to be transmitted at higher speeds than a conventional telephone line or other wireless modes of data transfer. The high-speed broadband internet network comprises a 5G network and a next generation Wi-Fi network.

As referred herein, "computer vision" is an interdisciplinary field that deals with how computers can be made for gaining high-level understanding from digital images or videos. Computer vision tasks include methods for acquiring, processing, analyzing, and understanding digital images, and extraction of high-dimensional data from the real world to produce numerical or symbolic information.

As referred herein, "Deep-Neural Network" (DNN) is a multilayer tandem neural network comprising Artificial Neural Networks (ANN), Convolution Neural Networks (CNN) and Recurrent Neural Networks (RNN) that can recognize sounds and graphics, do an expert review and perform actions that require predictions, creative thinking, and analytics.

As referred herein, "Convolutional Neural network" (CNN) is a class of deep, feed-forward artificial neural networks, applied to analyzing visual imagery i.e., videos and images. Filters or kernels are the building blocks of CNN. Convolutional operations kernels extract relevant and correct features of fire from the input images. The CNNs in this invention use a variation of multilayer perceptrons designed to require minimal pre-processing. They are also known as Shift Invariant or Space Invariant Artificial Neural Networks (SIANN), based on their shared-weights architecture and translation invariance characteristics.

As referred herein, "evolutionary algorithms" are efficient heuristic search methods based on Darwinian evolution with powerful characteristics of robustness and flexibility to capture global solutions of complex optimization problems. In computational intelligence (CI), an evolutionary algorithm (EA) is a subset of evolutionary computation, a generic population-based metaheuristic optimization algorithm. EAs are based on concepts of biological evolution and considered a component of evolutionary computation in artificial intelligence.

As referred herein, "geolocation" is the process of finding, determining, and providing the exact location of a given object. It is used to identify the location of an object or target based on geographical coordinates and measurements.

As referred herein, "geospatial analysis" is the process of gathering, displaying, and manipulating visual-based imagery, Global Positioning System (GPS), satellite photography and historical data, described explicitly in terms of geographic coordinates. Such intelligent geographic information systems are used to learn, analyze and predict all kinds of phenomena affecting the environment, forest areas in arid and semi-arid areas and inhabitants which would include humans as well as wild animals. Geospatial analysis is a method of applying statistical analysis and deep-learning techniques to known data which has a geographical or geospatial aspect.

As referred herein, "Internet of Things" (IoT) are an inter-networking of physical devices, controllers, and other items embedded with electronics, software, sensors, actuators, and network connectivity that enable these objects to collect and exchange data and interact with a communications network like the Internet, etc. connected to a high-performance IoT Network. The IoT network is a collection of interconnected devices that communicate with other devices in the system without the need for human involvement. A network of physical objects-"things" or objects—that are embedded with sensors, software, and edge-computing technologies for the purpose of connecting and exchanging sensory data with other devices and systems over the Internet.

In 2013, the Global Standards Initiative on the Internet of Things (IoT-GSI) defined the IoT as "an infrastructure of an information society." The IoT allows objects to be sensed or controlled remotely across existing network infrastructure, creating opportunities for more direct integration of the physical world into computer-based systems, and resulting in improved efficiency, accuracy and economic benefit in addition to reduced human intervention.

In one embodiment, the IoT based control system of a plurality of self-steering unmanned aerial devices, is provided. The IoT based control system comprises one or more detectors, a main controller, and a memory coupled to the main controller and storing computer programs that, when executed by the main controller, causes the main controller to control a takeoff and landing of the plurality of self-steering unmanned aerial vehicles. In the event of an internal part failure or the battery failure or the device catching fire, the IoT system is capable of recognizing the event, managing a switch over of the plurality of self-steering unmanned aerial devices with the damaged or failed devices and safe landing of the failed devices. The IoT system, by continuously tracking the path of the plurality of self-steering unmanned aerial devices, is also capable of controlling collision and avoiding crashes.

As referred herein, "neural network" is a computational learning system that uses a network of functions to understand and translate a data input of one form into a desired output, usually in another form.

In one embodiment, the neural network comprises a nonlinear, non-parametric pattern recognition algorithm that operates by defining a probability density function for a plurality of data sets that are each based on a training set data and an optimized kernel width parameter. The plurality of data sets includes a baseline, a non-fire event, first data set, a second, fire event data set, and a third, nuisance data set. The algorithm provides a decisional output indicative of the presence of a fire based on recognizing and discrimination between said data sets, and whether the sensor outputs suffice to substantially indicate the presence of a fire, as opposed to a non-fire or nuisance situation. Upon the detection of conditions, which suffice to substantially indicate the presence of a fire, an alarm or warning condition is issued.

In another embodiment, the neural network is used to provide an output corresponding to a flame condition. The system has at least one optical sensor channel, each including an optical sensor configured to receive optical energy from a surveilled scene within a field of view at a hazardous location, the channel producing a signal providing a quantitative indication of the optical radiation energy received by the optical sensor within a sensor spectral bandwidth. A processor is responsive to the signal from the at least one optical sensor channel to provide a flame present indication of the presence of a flame, and a quantitative indication representing a magnitude of the optical radiation energy from the surveilled scene.

In another embodiment, the neural network is used to provide an output corresponding to a smoke condition. The method comprises (1) electronically capturing a sequence of images of a light source in the monitored area, (2) transferring these images into an image buffer, (3) scanning these images to identify the chunks of adjacent pixels with brightness values above a prescribed threshold, (4) maintaining the sequence of such chunks obtained from consecutive images in a cluster stack, (5) analyzing the evolution of the features of each of these cluster over a prescribed period of time to identify the patterns that are caused by particle-induced light diffusion, and (6) issuing a prescribed system response in the event such light diffused patterns are identified.

In another embodiment, the neural network is used to provide an output combustible object corresponding to a smoke or fire condition. The method comprises (1) electronically capturing one or more digital signatures of a smell from near a smoke or fire source, (2) transferring these digital signatures into a database, (3) scanning the database to identify a combustible object source with similar digital signature, (4) confirming the combustible object by visual combustible object tagging tool.

As referred herein, "neuroevolution" refers to a form of artificial intelligence that applies biologically inspired methods to evolve artificial neural networks. Here, biologically inspired methods refer to evolutionary algorithms which use a population-based metaheuristic and mechanisms such as selection, reproduction, recombination, and mutation to generate solutions.

In one embodiment, neuroevolution measures performance in terms of a fitness metric and hence works with sparse feedback by detecting a change in an input stream via sensing events to a first spiking neural network for one of a control, a detection and a classification application using a processor apparatus, the processor apparatus comprising a special purpose processor and memory and executing a special purpose stored program for the one of the control and therefore, can be applied more broadly because it does not require a large set of correct input-output pairs. Instead, it needs that a) the performance can somehow be measured over time, and b) the behavior of the networks can be modified through evolution.

As referred herein, "Unmanned self-steering Aerial Vehicle" (UAV), commonly known as a drone, is an aircraft without a human pilot aboard. UAVs are a component of an Unmanned self-steering Aircraft System (UAS), which include a UAV, a ground-based controller, and a system of communications between the two. The flight of UAVs may operate with various degrees of autonomy: either under remote control by a human operator or autonomously by an onboard computer.

As referred herein, "Unmanned Ground Vehicle" (UGV) can be a vehicle that operates while in contact with the ground and without an onboard human presence.

As referred herein, "reinforcement learning" is the training of machine learning models to make a sequence of decisions wherein an artificial intelligence faces a game-like situation. The computer-based machine learning model employs trial and error to generate a solution to a problem.

In one embodiment, "database" comprises responses of a multitude of sensors to several different types of fires and nuisance sources is analyzed using a variety of methods. This database, in an embodiment, comprises background or baseline data, data collected prior to the start of a fire/nuisance event. Data surrounding the source ignition/initiation, and progression through termination is collected. Multivariate data analysis methods are trained to recognize the pattern of start and progression of a fire. The database stores extremely large data sets that may be analyzed computationally to reveal patterns, trends, and associations, to provide situational awareness via predictive analytics using a high-performance artificial intelligence-based engine (AI engine).

As referred herein, "deep-learning" is an artificial intelligence function that mimics the workings of the human brain in processing data for use in detecting objects, recognizing speech, translating languages, and making split-second decisions. Deep-learning artificial intelligence can learn without human supervision, drawing from data that is both unstructured and unlabeled.

As referred herein, "vegetation features" refers to tree crown diameter, coverage, and density.

As referred herein, "terra firma" refers to a dry land in which the ground is distinct from the sea or air.

As referred herein, "tensors" are matrices of numbers with additional dimensions. The model is effective in perceiving images as volumes, i.e., as three-dimensional objects. Each pixel of an image i.e., the intensity of Red, Green, and Blue (RGB) is to be expressed by a number. And the given number is an element in one of the three, stacked two-dimensional matrices, which together form the image volume.

As referred herein, "vegetation type" is natural vegetation as well as human grown vegetation. The type of vegetation is decided based on temperature, moisture, land slope and thickness of soil. Dry and dense vegetation is highly susceptible to fire whereas moist and thinly distributed forest is less prone to fire.

As referred herein, "climate" includes information on the average temperature in different seasons, rainfall, sunshine, precipitation, pressure, and humidity.

As referred herein, "topography" is natural and artificial features of land surface including height compared to the sea, slopes, altitude, elevation, and geospatial aspect.

As referred herein, "elevation" is a crucial physiographic variable that is associated with wind behavior and therefore it affects fire capability, so it has a big role in fire spreading. Elevation influences vegetation structure, fuel moisture and air humidity. It is mentioned that humidity and temperature have a higher influence on fire at upper altitude areas than lower ones (Thompson 2000).

As referred herein, the term "slope" is one the parameters that influences fire behavior. Fire moves most quickly up slope and least quickly down slope (Adab et al. 2011). Also, in steeper slopes, rate of fire spread might rise, since flames are angled closer to the surface of ground and wind effects can supply the process of heat convection for the fire produced (Zhong 2003).

As referred herein, "aspect or geospatial aspect" is defined as the directional component of the gradient vector and is the direction of maximum gradient of the surface at a given point. As with slope, the aspect is calculated from estimates of the partial derivatives aspect (Malaperdas 2018). South aspects have received more sunlight and exposure in the North hemisphere, because of that, drier soil is more capable of igniting. South aspect slopes are higher temperatures, robust winds, minor humidity and lower fuel moistures because Southern aspects receive more direct heat from the sun (Lin and Sergio 2009).

As referred herein, "risk-based analysis" is defined as a method of risk assessment which considers a range of possible performance standards for each component—based on recognized design standards—and then optimizes the overall barrier and combined barriers to give the most cost-effective risk reduction. For example, options to provide increased protection include active fire protection with high installation and maintenance costs but high-risk reduction, and passive fire protection with lower costs but shorter lifespan and less risk reduction. Once performance standards are defined, assurance processes need to be put in place to confirm that barriers remain fit for purpose.

As referred herein, "immersive technology" is an integration of virtual content with the physical environment in a way that allows the user to engage naturally with the blended reality. In an immersive experience, the user accepts virtual elements of the environment as part of the whole, potentially becoming less conscious that those elements are not part of physical reality. Immersive technologies include virtual reality (VR), augmented reality (AR), mixed reality (MR), holography, telepresence, digital twin, First-Person View (FPV) drone flight—use of an unmanned aerial vehicle (UAV) with a camera that wirelessly transmits video feed to goggles, a headset, a mobile device or another display so that the user has a (FPV) of the environment where the drone flies. Supporting technologies for immersive experiences include AR, MR and VR headsets, 3D displays, 3D audio, gesture recognition, spatial sensing, speech recognition, haptics, drones, cameras and omnidirectional treadmills.

As used herein, "notification," "warning," or "warning signal" refers to a message containing information of predictions. In some embodiments, a notification or warning comprises additional information, such as, for example, advice for escaping, resolving, mitigating, or reducing the likelihood of occurrence of the risk or emergency.

As used herein, the term "based on" is defined as dependent on.

As used herein, "one or more users" refers to one or more relevant authorities, a fire department, a fire service station, and a brigade.

As used herein, the term "a plurality of" is defined as multiple.

As used herein, the term "memory" is defined as any device in which information can be stored.

As used herein, the term "execute" is defined as run or launch.

As used herein, the term "instructions" is defined as software program or machine executable code.

As used herein, "images" refers to still-images, Infra-Red (IR) images, and videos. One or more first images are the images taken from one or more regions of interest of a geographical region and one or more second images are the images of one or more risk areas mapped from the one or more first images of the one or more regions of interest.

As used herein, "combustible object" is an object made of combustible material or a flammable material. A combustible material is something that can combust (burn) in air. Flammable materials are combustible materials that ignite easily at ambient temperatures.

As referred herein, "Machine to Machine (M2M) manager" provides a single management solution for connected devices related to system integrable by API. M2M communication is direct communication between devices using any communications channel, including wired and wireless. Such communication is accomplished by having a remote network of machines relay information back to a central hub for analysis, which is then rerouted into a system like a personal computer.

As used herein "database" refers to a set of computer readable storage mediums associated with a set of computer executable programs. The database stores all the information related to one or more regions of interest of a geographical region, the one or more first images of the one or more regions interest, one or more ambient weather related information, one or more land related information, data on past fire history, one or more second images, one or more risk areas mapped from the one or more first images of the one or more area of interest, one or more smoke or fire related signals, recognized one or more smoke or fire related signals, geolocation, convolutional output, one or more fire characteristics and one or more machine learning algorithms.

As used herein "computing device" refers to any personal digital assistant unit comprising but not limited to a desktop, a Laptop, a mobile phone, a handheld PC, a smart phone, etc.

FIG. 1A illustrates a schematic view of a smoke and fire recognition, forecasting, and monitoring system, according to one or more embodiments. The system described herein comprises a plurality of self-steering unmanned aerial devices 120, a ground-based controller 150, a communication device 152, and a server 100. The plurality of self-steering unmanned aerial devices 120 is communicatively coupled to the server 100 via a communication network through the communication device 152. The communication network may be a wired communication network or a wireless communication network. The plurality of self-steering unmanned aerial devices 120 described herein comprises an unmanned aerial vehicle (UAV) 122, plurality of sensors 124, a computing device 126, a geolocation device 128, a UAV communication device 130, a UAV controller 132 and a UAV memory 134. The plurality of self-steering unmanned aerial devices 120 are smart devices that comprise a smart unmanned aerial vehicle (UAV). The plurality of self-steering unmanned aerial devices 120 comprising the geolocation device 128 is aware of its location in (X, Y, Z) space or (X, Y, Z) geo-space and/or (X, Y) space and/or (X, Y) geo-space. In an embodiment, the plurality of self-steering unmanned aerial devices 120 is hovering at one or more regions of interest for a geographical region and the server 100 is located at a remote place. The smart self-steering UAVs is a progressively present-day term, deriving that sensor-devices inside these UAVs feed into a cloud-based system framework (artificial engine, IoT engine, back-end processors and virtual machines) where drones are associated with different gadgets utilizing internet advancements, which empowers correspondence and therefore, makes them keen. At the same time, smart self-steering UAVs equipped with a plurality of sensors 124 can obtain multiple data from remote locations. The UAV controller 132 together with the ground-based controller 150 is capable of controlled movement and device management. The plurality of self-steering unmanned aerial devices 120 has an existing library of the one or more first images of the topography of the forest area under surveillance in the UAV memory 134 and continuously collects the one or more ambient weather related information using the plurality of sensors 124. This information is communicated to the server 100 comprising an artificial intelligence and machine learning framework which then can look through a potential flame, setting off a caution to firefighting staff, confining the blaze and following its development, and foresee the advancement of the fire with the continuous data of wind and firefighting conditions. The system by processing and analysing the data stream is capable of performing operations related to fire recognition and fire control. The system is able to identify a fire by distinguishing between smoke and non-smoke targets and thereby control the identified potential fire at an early stage.

Figure 1B:
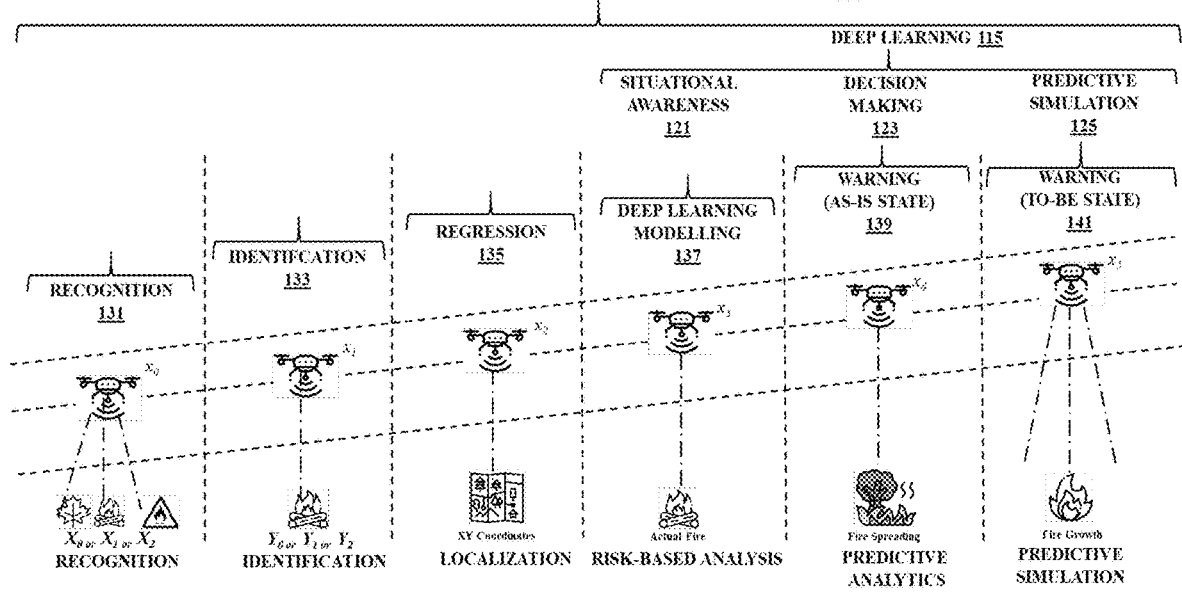

FIG. 1B illustrates a functional view of a smoke and fire recognition, forecasting, and monitoring system, according to one or more embodiments. The plurality of self-steering unmanned aerial devices periodically sends one or more first images, one or more second images, one or more ambient weather related information, and one or more land related information, wherein the one or more land related information comprise vegetation features, terra firma, topography, elevation, slope and aspect, of one or more regions of interest, of a geographical region to the server. The artificial intelligence and machine learning framework 101 utilizes deep neural networks comprising convolutional neural network, recurrent neural network, deep Learning 115 and can-do risk-based analysis. Immersive technology with the artificial intelligence and machine learning framework 101 is also used to generate predictive analysis and rendering the same in the form of a simulation to aid humans in the visualization of the possible fire growth and spread based on topography, weather and wind conditions and other fueling factors present in the environment. The recognition 131 of fire is done by the plurality of self-steering unmanned aerial devices by capturing one or more smoke or fire related signals ($X_0$, $X_1$ or $X_2$) using one or more sensors from one or more positions (x0-x5). The identification 133 of fire is done by detecting one or more fire characteristics ($Y_0$, $Y_1$ or $Y_2$) from the captured one or more smoke or fire related signals. By regression 135 of X and Y, spot of start of fire and time of start of fire is located. Deep learning 115 is used for situational awareness 121, decision making 123 and predictive simulations 125. The threat analysis is done by deep learning modeling 137. The results of situational awareness 121 are used to generate warning for fire as is the current state by predictive analytics and the warning for the future state is generated using predictive simulations.

Figure 2:
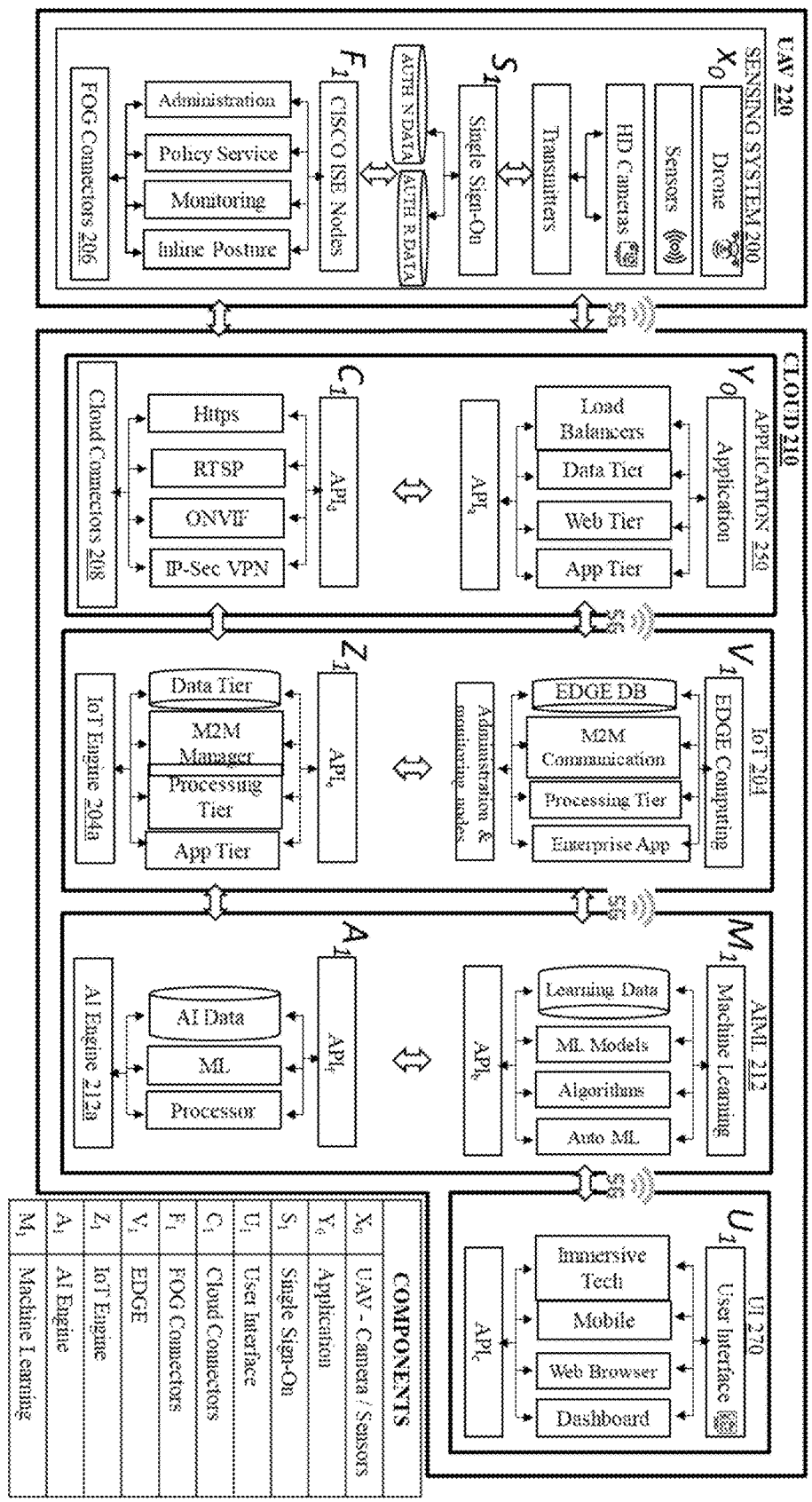
FIG. 2 illustrates a logical architecture of components and connectors of a smoke and fire recognition, forecasting, and monitoring system, according to one or more embodiments.

FIG. 2 illustrates a logical architecture of components and connectors of a smoke and fire recognition, forecasting, and monitoring system, according to one or more embodiments.

In one embodiment, the components of the system comprise a plurality of self-steering unmanned aerial devices 220 comprising sensing system 200, an artificial intelligence and machine learning platform 212 embedded in the cloud 210, and an Internet of Things device management system (IoT) 204 comprising IoT engine 204a. These components interact with each other via one or more fog connectors 206 and cloud connectors and 208 through a plurality of applications 250. The system can be accessed through a user interface (UI) 270 by a single sign on.

In another embodiment, a high-performance computing server comprising of several processor cores (dual-core, quad-core, etc.), several integrated electronic circuits, high amount of random-access memory, a high-speed communication device and a dedicated or cloud-computing database can be used as the artificial intelligence and machine learning platform.

In another embodiment, the system is designed to move away from rule-based events and activities to risk-based decision making. The system is a highly intelligent monitoring and surveillance system and is able to identify and address the highest potential risk. The AI engine deploys high performance machine learning models to identify and recognize weather and ground activities that include human activity (lighting of a cigarette) that represent potential safety risk, even if technically deemed compliant and normally allowable activity such as use of equipment and the use of safe campfires. Surveillance and analysis is based on potential risk and focused on identifying areas of highest potential risk. The deep learning system collects large amounts of prioritized data which eventually requires less manual and human validation. Activities exhibiting potential risk undergo further analysis using the AI Engine deploying high performance machine learning models. The focus is on areas of potential risk (aggregated data) instead of responding to individual activities. The AI generated data is refined and driven by potential risk vs rules adherence, enabling fire safety experts to prioritize validated risk and focus resources on mitigation. The deep learning models and the risk-based process produce a meaningful risk calculation that can be used for risk-based decision making. The AI engine uses a risk-based score including a preventative and mitigating process to calculate the severity and likelihood to predict the imminent risk. The risk-based score is the basis for the severity and the likelihood calculation. When a potential risk hazard (wildfire) is recognized and identified, the machine learning model begins tracking and closely monitoring the risk hazard and assigns a score based on the estimated risk. The score is a prediction of the worst-case scenario. The probability of two truly identical risk hazards occurring is relatively low and not two risk hazards are going to ever be the same in all aspects. Hence, a narrower definition of likelihood to estimate the probability of the risk hazard under analysis is used. A preventative and severity scores are used to calculate how the combination of the factors leading to the risk hazards possibly repeat for the likelihood of a potential wildfire hazard. The preventative risk hazards are mapped to discrete numerical measures. The closer the score is to 0 on the sliding scale, the higher the estimated risk is to the outcome of a potential wildfire. For example, a risk hazard with an absolute outcome is assigned a numerical value of 0 and correspondingly, a partial outcome is assigned 0.5, and an identified risk hazard with a safe outcome is assigned a value of 1.0 such as safe use of equipment and a well monitored campfire. Hence, a lower number is a relative indication of a potential wildfire scenario. We employ two approaches to estimate the likelihood of the wildfire, and the final calculation will be done based on empirical results after collecting sufficient structured and unstructured data. In the probability approach, a relative frequency of severity and preventative measures of risk hazards are used. That is, the system considers the number of historical events with a given severity and a particular preventative risk mitigation failure condition as a proxy to the probability of such a wildfire growth and spread occurring. If an identified fire risk is on a potential wildfire course and the UAV and fire safety personnel are aware of the situation (while communicating and taking the correcting actions), the system works to avoid a potential wildfire. Credit is assigned to well performing mitigation actions enforced by the system and deployed process. Assigning credit is done by recoding the status of the mitigating actions into numerical values to identify how effective a preventive and corrective action was. If a preventive and corrective action worked, partially worked, or failed, a value of 1, 0.5, and 0 is respectively assigned.

Figure 3A:
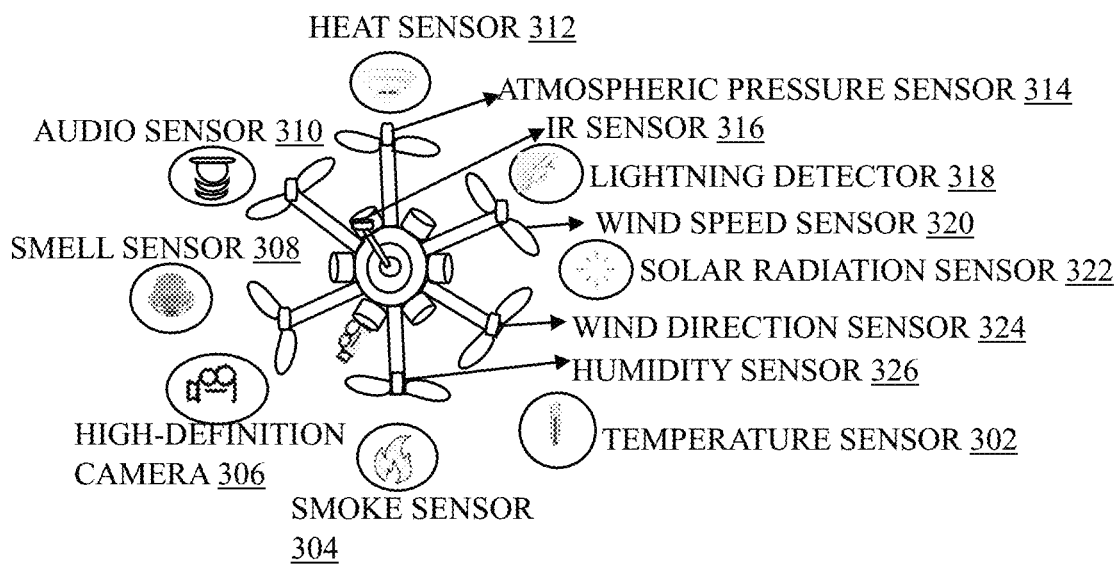
FIGS. 3A-3B illustrate a schematic view of a plurality of sensors on a plurality of self-steering unmanned aerial devices and their functional aspects, according to one or more embodiments.
Figure 3B:
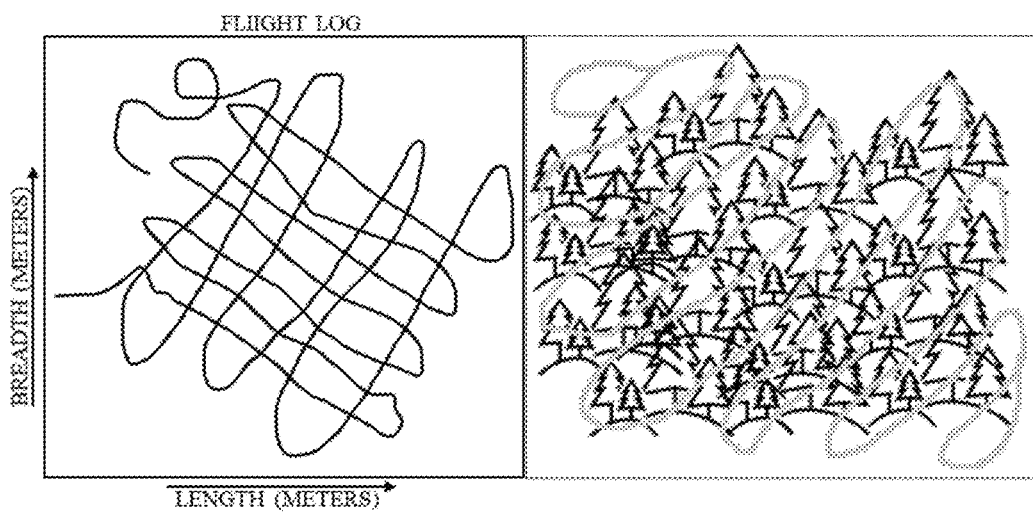

FIGS. 3A-3B illustrates a schematic view of a plurality of sensors on the plurality of self-steering unmanned aerial devices and their functional aspects, according to one or more embodiments. The plurality of sensors as described herein comprises a temperature sensor 302, a smoke sensor 304, a high-definition camera 306, a smell sensor 308, an audio sensor 310, a heat sensor 312, atmospheric pressure sensor 314, Infra-Red (IR) sensor 316, a lightning detector 318, a wind speed sensor 320, a solar radiation sensor 322, a wind direction sensor 324, and a humidity sensor 326. The plurality of sensors are configured to periodically generate sensor data that may form part of fire-related information. The heat and audio detection sensor based surveillance technology reduces clutter noise and improves the scope and accuracy of the captured visualization using deep learning techniques, by rendering timely situational awareness and facilitating real-time decision making that includes the start of fire, size of the fire, rate of spread, intensity of the fire, presence of fire whirls, ember production and spotting, soil heating, temperature, heat output for surface, fuel moisture, topography, ignition method, air temperature, wind, relative humidity and more. Using a well-integrated visual based surveillance system, the accuracy of can be augmented using existing heat and audio sensors, thereby increasing the accuracy of wildfire detectors, and most importantly, allow authorities to take precautions, prevent, and reduce the extent of the perceived damage due to such disasters. The device, in accordance with the present invention, can analyze a plurality of inputs received from the combination of sensors using fuzzy inference to determine if a fire condition is present and accordingly raise an alarm or provide alternate appropriate feedback and response. FIG. 3B illustrates the flight patch for surveillance and monitoring using the plurality of self-steering unmanned aerial devices, according to one or more embodiments.

Figure 4:
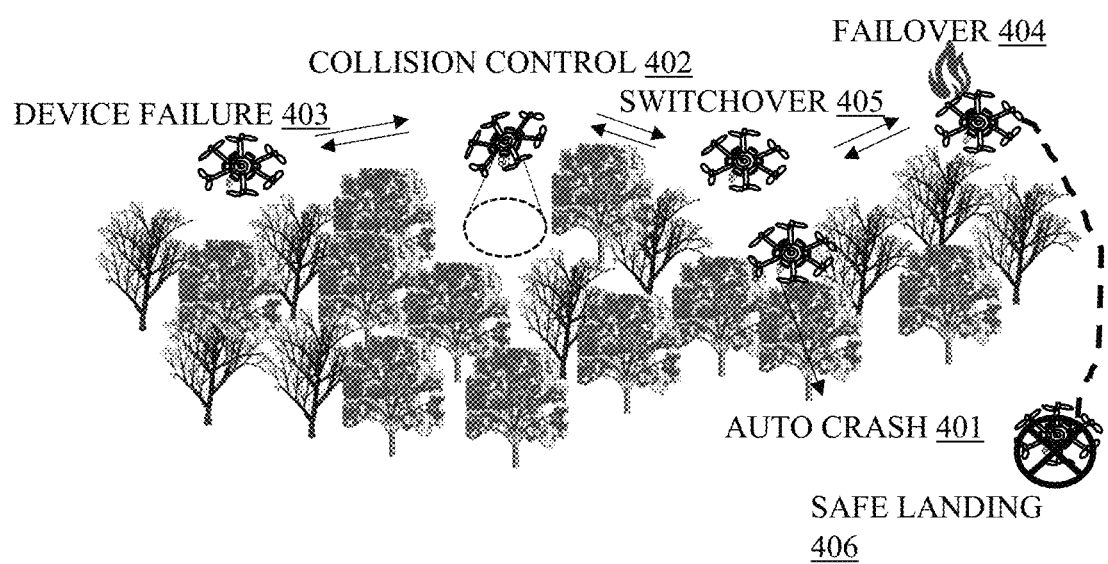
FIG. 4 illustrates a schematic view of management of a plurality of self-steering unmanned aerial devices using an Internet of Things (IoT) device management system, according to one or more embodiments.

FIG. 4 illustrates a schematic view of management of the plurality of self-steering unmanned aerial devices using an Internet of Things device management system (IoT), in one or more embodiments. In one embodiment, the plurality of self-steering unmanned aerial devices are controlled by a ground-based controller. The ground-based controller is an Internet of Things based device management system (IoT). The Internet of Things device management system (IoT) is a set of self-organizing networks built from plural nodes that may spontaneously create an impromptu network, assemble the network themselves, dynamically adapt to device failure and degradation, manage movement of nodes, communicate with every other part or things in the network, detect changes and failures before they occur and react to changes in task and network requirements. The plural nodes are reconfigurable smart sensor nodes that are self-aware, self-reconfigurable and autonomous. The Internet of Things (IoT) device management system is capable of automatically monitoring and dynamically reacting for events to analyze causes of the events and corresponding solutions. The events can include auto crash 401, collision control 402, device failure 403, failover 404, switch over 405 and safe landing 406. The example of device failure is non-working of any internal functioning part or sensors, and the example of failover is battery failure and device catching fire. In these circumstances, IoT is capable of recognizing the event, managing a switch over of the plurality of self-steering unmanned aerial devices with the damaged or failed devices and safe landing of the failed devices. The IoT, by continuously tracking the path of the plurality of self-steering unmanned aerial devices, is also capable of controlling collision and avoiding crashes.

Figure 5:
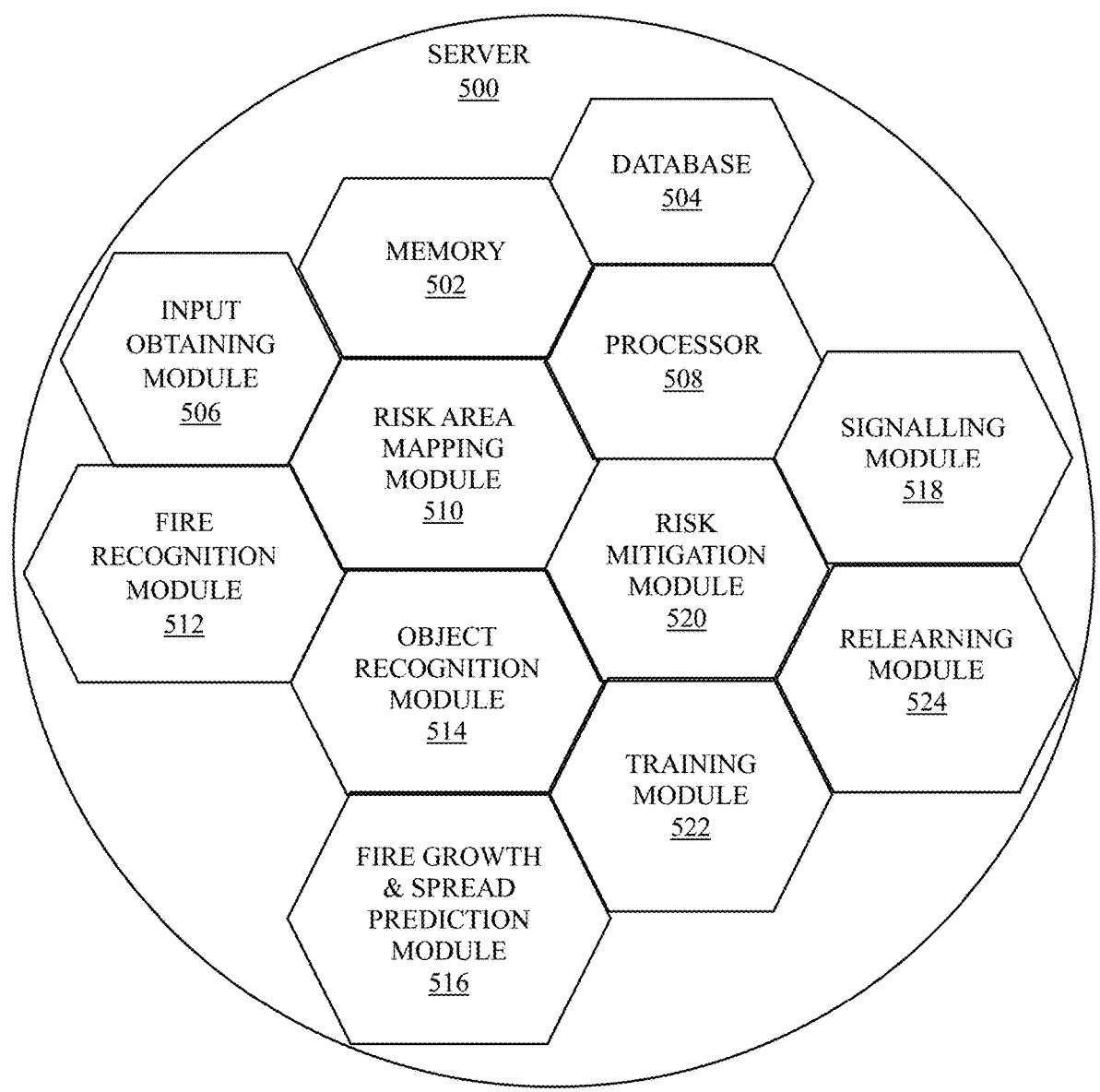
FIG. 5 illustrates an exploded view of a server, according to one or more embodiments.

FIG. 5 illustrates an exploded view of a server 500, according to one or more embodiments. The server 500 comprises a memory 502, a database 504 and a processor 508. The processor 508 comprises a graphical processing unit (GPU) and a central processing unit (CPU). The processor 508 is configured to support in risk area mapping, fire forecasting, fire monitoring, combustible object recognition, generating warning signal, fire-growth & spread prediction and risk mitigation. The server 500 further comprises an input obtaining module 506, a risk area mapping module 510, a fire recognition module 512, a combustible object recognition module 514, a fire-growth & spread prediction module 516. The server 500 further comprises a risk mitigation module 520, a signalling module 518, a training module 522 and a relearning module 524. The processor 508, in association with the above-mentioned modules, is configured to perform at least one of risk area mapping, fire forecasting, fire monitoring, combustible object recognition, generating warning signal, fire-growth & spread prediction and risk mitigation. The server 500 may receive inputs in any combination. The input obtaining module 506 obtains inputs as at least one of, one or more first images, one or more second images, one or more ambient weather related information, data on past fire history, and one or more land related information of a geographical area. The one or more ambient weather related information comprises but is not limited to wind speed, wind direction, humidity, temperature, wind pattern, lightning, and season. The one or more land related information comprise vegetation features, terra firma, topography, elevation, slope and aspect of the one or more regions of interest of the geographical region. The geographical region comprises a forest, a mountain, a grassland, a farmland, a desert, a hill, a peat land, a prairie area, a valley, and a veld. The one or more first images and the one or more second images comprise still-images, videos, and infrared images. The input obtaining module 506 obtains the inputs from a computing device of the plurality of self-steering unmanned aerial devices and the database 504. The input obtaining module 506 obtains the inputs in any combination. In another embodiment, the input obtaining module 506 obtains the inputs that are obtained and stored in the memory 502. The input comprises one or more first images, one or more second images, one or more ambient weather related information, one or more land related information, data on past fire history and geolocation of one or more regions of interest. The risk area mapping module 510 automatically maps the one or more regions of interest of a geographical area into one or more risk areas. The fire recognition module 512 recognizes the start of fire or the presence of fire in real time. The combustible object recognition module 514 identifies the location of the start of fire and the reason for the start of fire. The fire-growth & spread prediction module 516 automatically predicts the growth and spread of fire using a cloud-computing platform, artificial intelligence engine and the deep-neural network using a plurality of parameters. The signalling module 518 generates warning signals to one or more users on possible start of fire. The risk mitigation module 520 generates a risk mitigation report from generating a risk mitigation report from the provided information for situational awareness and decision making. It provides advice for escaping, resolving, mitigating, or reducing the likelihood of occurrence of the risk or emergency.

The training module 522 trains the deep-neural network using at least one input (the one or more first image, the one or more second image, the one or more land related information, the one or more ambient weather related information) and reference input provided to the deep-neural network. In one embodiment, the deep-neural network is trained to automatically map the one or more risk areas of the one or more regions of interest using the one or more first images of the one or more regions of interest, the land related information, the one or more ambient weather related information, the one or more risk areas, one or more reference risk areas, and one or more mapped risk areas. In another embodiment, the deep-neural network is trained to automatically recognize, the one or more smoke or fire related signals from the one or more second images of the one or more risk areas and the one or more ambient weather related information, using the one or more smoke or fire related signals, the one or more first images, the one or more second images, the one or more land related information, the one or more ambient weather related information, the one or more risk areas, one or more reference smoke related signals, one or more reference fire related signals, and one or more mapped risk areas. In yet another embodiment, the deep-neural network is trained to automatically predict the existence of the fire causing smoke, fire, fire-growth and spread using the one or more second images, the one or more ambient weather related information, of the one or more regions of interest, the one or more land related information, one or more reference fire characteristics and one or more reference fire spread profile.

The relearning module 524 enables reinforcement-deep-learning to process and learn from huge quantities of labelled and unlabelled data. The machine-learning or relearning is done by executing one or more machine-learning algorithms, wherein one of the machine-learning algorithms comprises an evolutionary algorithm.

Figure 6:
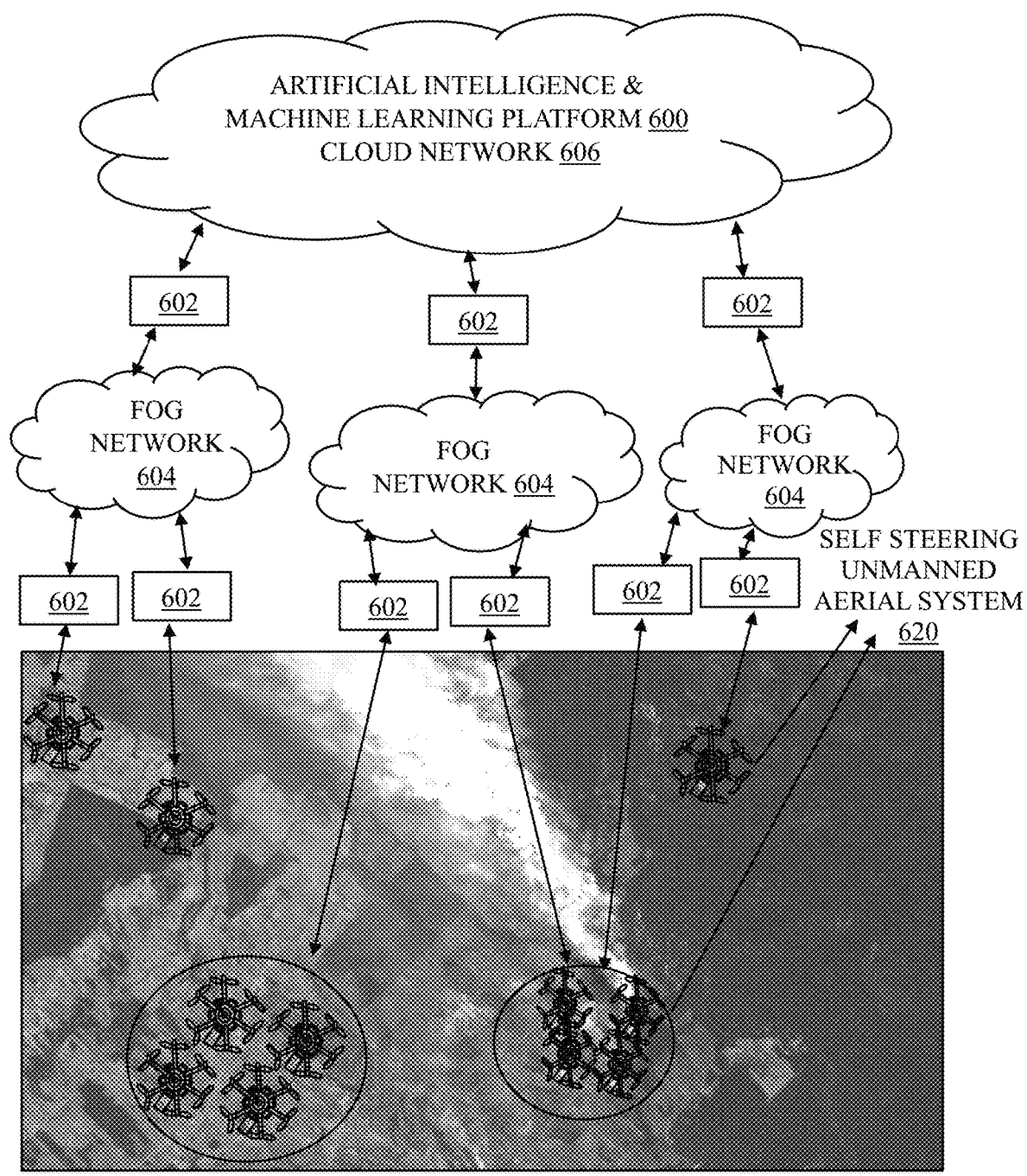
FIG. 6 illustrates a schematic view of data transmission, storage and computation using a cloud-computing platform, according to one or more embodiments.

FIG. 6 illustrates a schematic view of data transmission, storage and computation using a cloud-computing platform, according to one or more embodiments.

In one embodiment, the cloud-computing platform comprising an artificial intelligence and machine learning framework 600 embedded in a cloud network 606, processes the data obtained from a fog network 604 and/or one or more edge computing devices. Only significant data with potential fire or smoke signals are transmitted to the cloud-computing platform via the fog network 604 and/or the one or more edge devices. The plurality of self-steering unmanned aerial devices connected via one or more edge devices transmits the preliminary signals to a fog network 604 for processing, to compress or condense the amount of data in order to transmit a reduced or summarized version of the relevant data to the cloud-computing platform. The data obtained from the plurality of self-steering unmanned aerial devices 620 is processed using edge computing and fog computing and sent to the cloud-computing platform for further execution. In a suitable embodiment, the transmission of data occurs through a high-speed broadband internet network comprising a 5G network 602 or a next generation Wi-Fi network.

Figure 7:
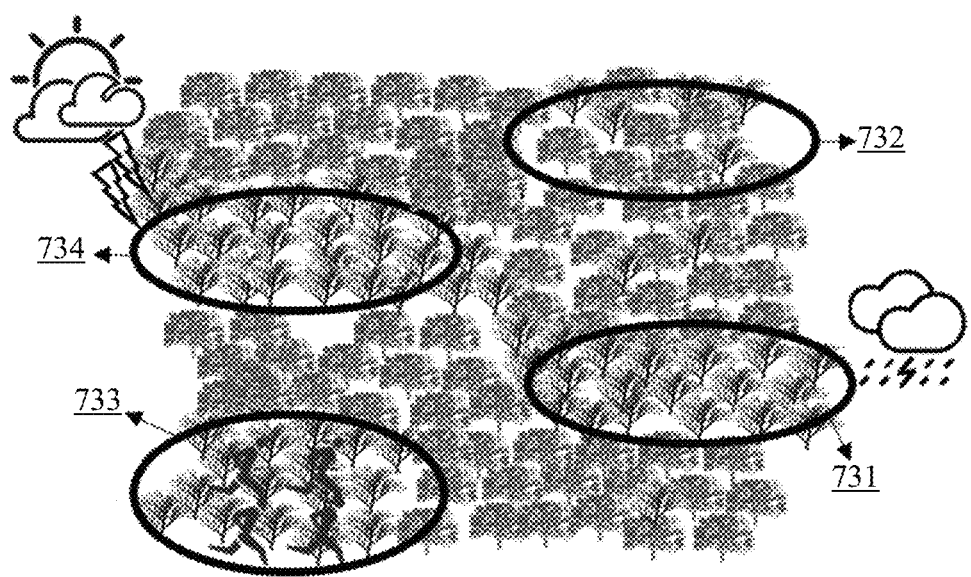
FIG. 7 illustrates an example risk areas assessment for mapping the area of one or more regions of interest of a geographical region, according to one or more embodiments.

FIG. 7 illustrates an example risk area assessment for mapping the one or more regions of interest of a geographical region from the one or more first images, according to one or more embodiments. The objective of mapping is to map the length and breadth of the forest areas—and identify the high-risk arid areas based on changes in temperature and rainfall. This method of mapping the forest areas using high-resolution imagery would compare and analyze changes to the topographic forest areas by color coding the mapped risk areas. The mapping automatically analyze the one or more risk areas from the one or more first images of the one or more regions of interest comprises extracting, with the deep-neural network executing on a processor, an arid vegetation land 731, a semi-arid vegetation land 732, an arid vegetation land with active human interference 733 and an arid vegetation land with dry lightning 734. Further, a relocation instruction from the server 700 of a geolocation of mapped one or more risk areas is sent to the plurality of self-steering unmanned aerial devices.

Figure 8:
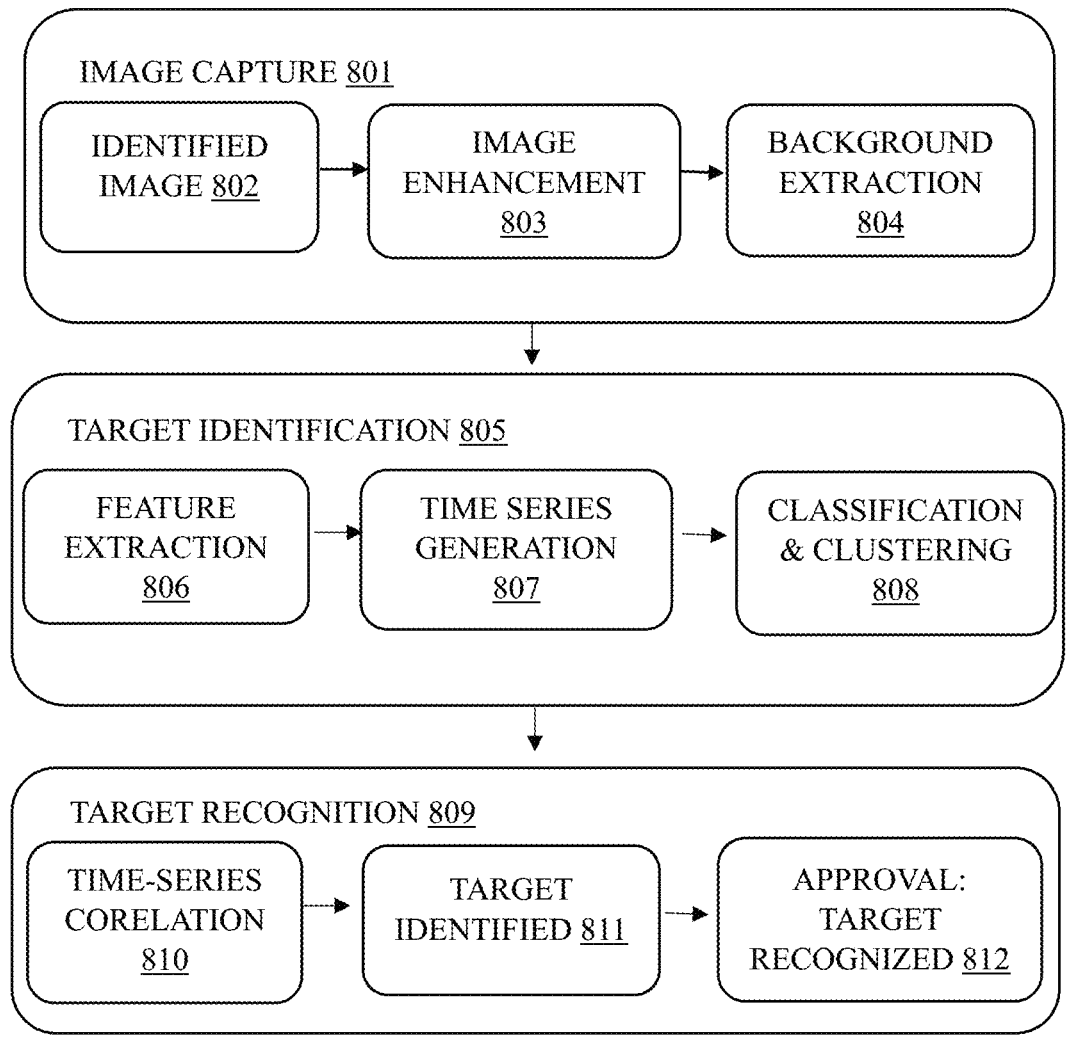
FIG. 8 illustrates a block diagram of image processing for image-based fire recognition, according to one or more embodiments.

FIG. 8 illustrates a block diagram of image processing for image-based fire recognition, according to one or more embodiments. In one embodiment, the one or more second images are processed by a convolutional neural network for detecting a fire causing smoke and the actual fire by distinguishing between smoke and non-smoke targets. The one or more second images comprise still-image, video image and IR image. The one or more second images are ingested by the Convolutional Neural Network (CNN) and processed as tensors that describe a multilinear relationship between sets of algebraic or geometric objects related to a vector space. Convolutional Neural Networks (CNNs) perform a computed search for the one or more smoke or fire related signals within one or more second images. The search for the one or more smoke or fire related signals is achieved by passing many filters over a single image and each one picks up a different signal to generate a convolutional output. At a rather initial process the model is designed to pass a horizontal line filter, a vertical line filter, and a diagonal line filter to create a map of the edges in the image. In one embodiment, the convolutional output comprises but is not limited to a spark, a flame, a smoke and an ember. The image capture 801, is the first step of image processing by the convolutional neural network wherein the one or more second images with probable presence of the one or more smoke or fire related signals are identified 802, enhanced 803 and background is extracted 804. The second step is target identification 805, wherein the features of convolutional output are extracted 806, time series of the one or more smoke or fire related signals is generated 807 and classification and clustering are done 808. Target recognition is done 809 by time-correlation 810. The target is identified 811, and the post approval target is recognized 812.

Figure 9:
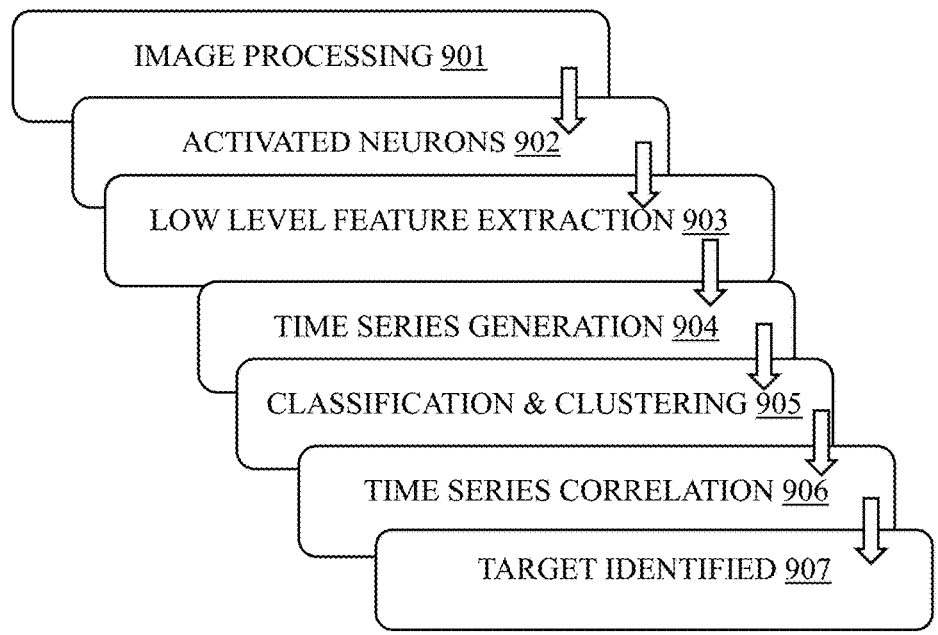
FIG. 9 illustrates a block diagram of input processing for recognition and confirmation of start of fire, according to one or more embodiments.

FIG. 9 illustrates a block diagram of input processing for recognition and confirmation of start of fire using deep-neural networks, according to some example embodiments. The start of fire is followed by a rapid rise in surface temperature, increase in surface heat, and emission of gases. The start of fire or the existence of fire is further confirmed by recognizing automatically, using a deep-neural network, the one or more smoke or fire related signals. The one or more smoke or fire related signals comprises smoke, a flame, a spark, an ember, a rapid rise in surface temperature, increase in surface heat and increase in $CO_2$ level. The time series data from audio sensor, gas sensor, heat sensor and temperature sensors are processed via a deep-neural network to verify the start and/or presence of fire. The heat sensor, gas sensor, temperature sensor, smoke sensor and audio detection sensor-based surveillance technology reduce clutter noise and improves accuracy of the captured visualization using deep-algorithms. Thermal cameras detect heat and assign colors based on the range of temperatures detected by sensors. Heat detection sensors have two main classifications of operation, 'fixed temperature' and the consequent 'rate-of-rise'. Rate-of-Rise (ROR) heat detection sensors operate on a rapid rise in element temperature of 6.7° to 8.3° C. (12° to 15° F.) increase per minute, irrespective of the starting temperature. The heat detector sensors are set to sense and provide a warning signal when the given environmental temperatures rise and reach a fixed point, typically indicating the start of a rapid fire. The automatic recognition of the existence of fire is performed using the deep-neural network. The automatic recognition method comprises a) image processing 901, b) activation of neurons 902, c) low level feature extraction 903, d) time series generation 904, e) classification and clustering 905, f) time series correlation 906 and g) target identification 907. The image is processed by a convolutional neural network to generate a convolutional output, which further activates the neuron. The feature extraction is done with a non-linear regression model operably coupled to the deep-neural network. A time-series pattern representation of the one or more smoke or fire related signals is generated and with a classifier operably coupled to the deep-neural network, the one or more smoke or fire related signals is classified based on the convolutional output and the start of fire is identified by time series correlation, of classified the one or more second images and the time-series pattern.

Figure 10:
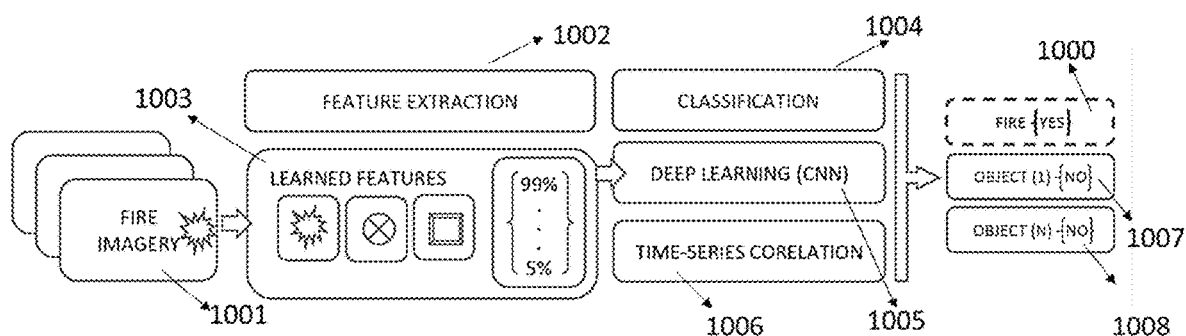
FIG. 10 illustrates a block diagram of steps used by the processor for combustible object recognition, according to one or more embodiments.

FIG. 10 illustrates a block diagram of steps used by the processor for combustible object recognition, according to one or more embodiments. On confirmation of start of fire 1000, one or more fire signals comprising one or more second images 1001, based on the features learned from the one or more first images 1002 and the features extracted from the one or more second images 1003, via deep-learning (models and techniques) 1005, are further classified, and by using time series correlation 1006, absence 1007 or presence 1008 of a combustible object are recognized. The classification 1004 for combustible object recognition is done by annotating the one or more second images using visual combustible object tagging tool to specify bounding boxes around edges of the one or more smoke or fire related signals. The one or more second image is processed through a plurality of filters to create a map of the edges of the one or more smoke or fire related signals and combustible objects are recognized within given scenes by slicing and indexing of the one or more second images using a N-dimensional array mapping method. The plurality of filters comprises a horizontal line filter, a vertical line filter, and a diagonal line filter. The exact cause of fire, precise geolocation, and timestamp of start of fire is identified by time series correlation analysis. This use of deep-learning combustible object detection models for fire identification and recognition can offer an effective and efficient system for wildfire recognition and real-time monitoring.

Figure 11:
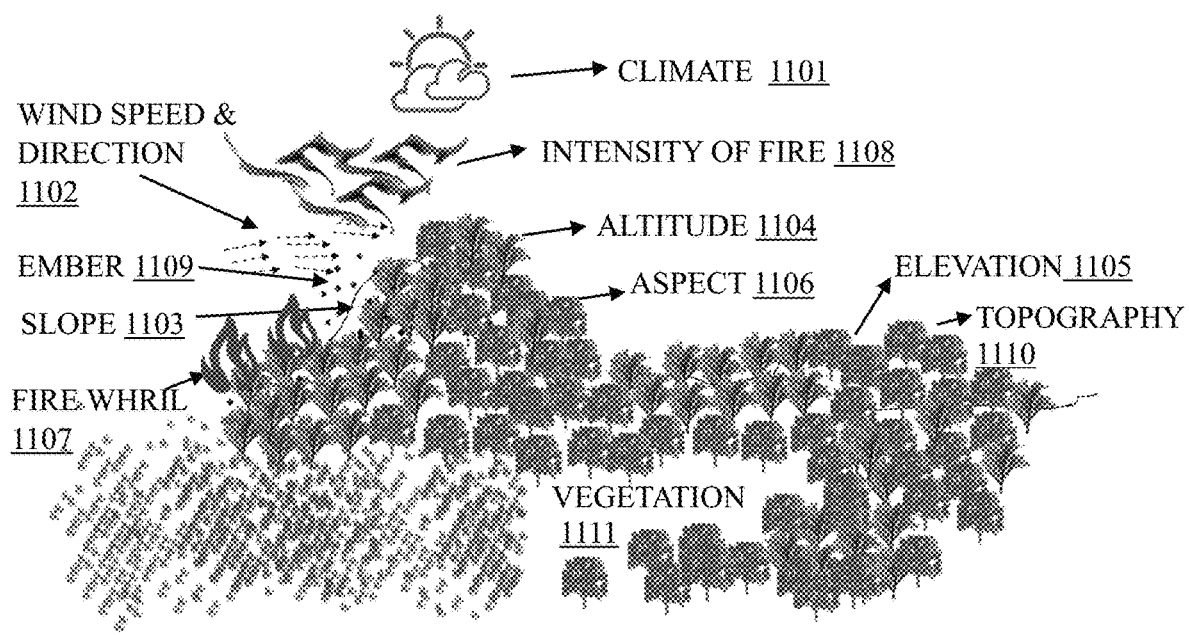
FIG. 11 illustrates the exemplary parameters for fire-growth and spread prediction, according to one or more embodiments.

FIG. 11 illustrates the exemplary parameters that affect fire-growth and spread, according to one or more embodiments. The plurality of parameters comprises climate 1101, wind direction and speed 1102, slope 1103, altitude 1104, elevation 1105, aspect (geospatial) 1106, presence of fire whirls 1107, ember production 1108, intensity of the fire 1109 topography 1110, and vegetation 1111. The predicting automatically existence of fire, fire-growth and spread comprises rendering the one or more fire characteristics comprising extracting start of fire, size of the fire, rate of spread, intensity of the fire, presence of fire whirls, ember production, spotting, soil heating, temperature, heat output for surface, fuel moisture, topography, ignition method, air temperature, wind speed, wind direction and relative humidity. Timely situational awareness provides information for decision making which allows authorities to take precautions, prevent, and reduce the extent of the perceived damage due to such disasters. Extremely large datasets can be analyzed computationally to reveal patterns, trends, and associations, especially relating to the behavior of very small fires and its consequent growth patterns. Big data patterns are developed and used to capture, curate, manage, and process data within a tolerable elapsed time. This type and preciseness of data formulation significantly thrusts the performance of the model suggesting that certain labeling and augmentation techniques make patterns and features of fire recognition more distinct, accurate and recognizable making the model highly predictive.

Figure 12A:
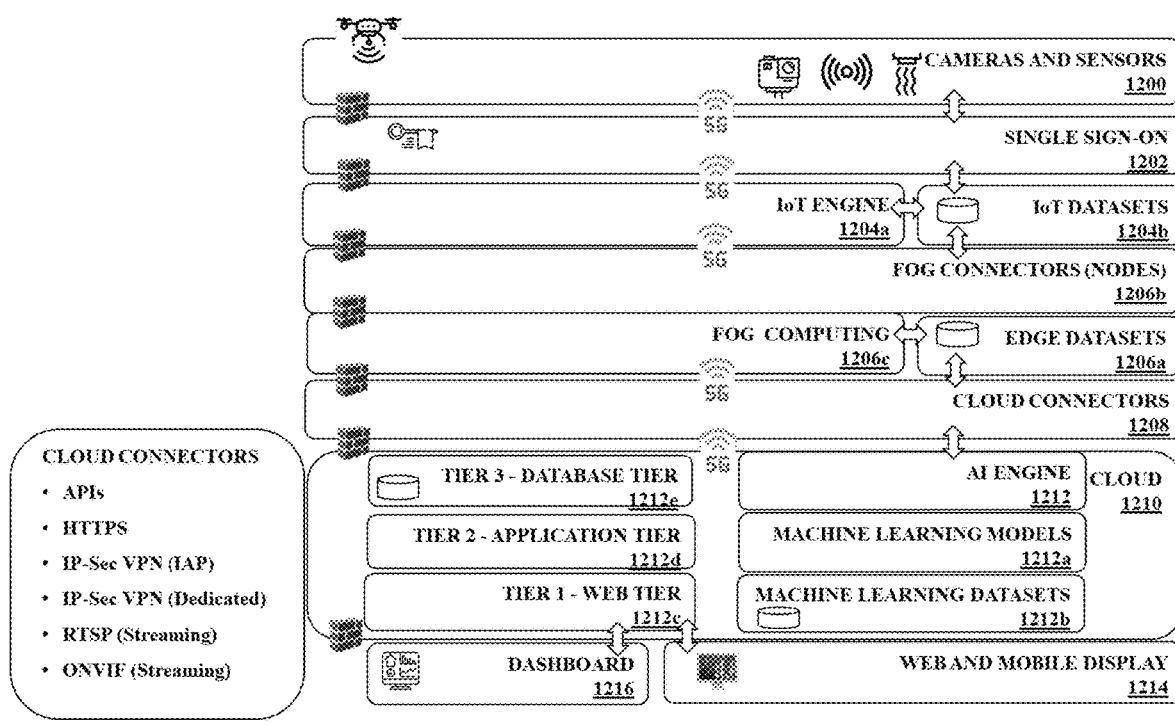
FIGS. 12A-12C illustrate use of an artificial intelligence and machine-learning platform for a smoke and fire recognition, forecasting, and monitoring system, according to one or more embodiments.
Figure 12B:
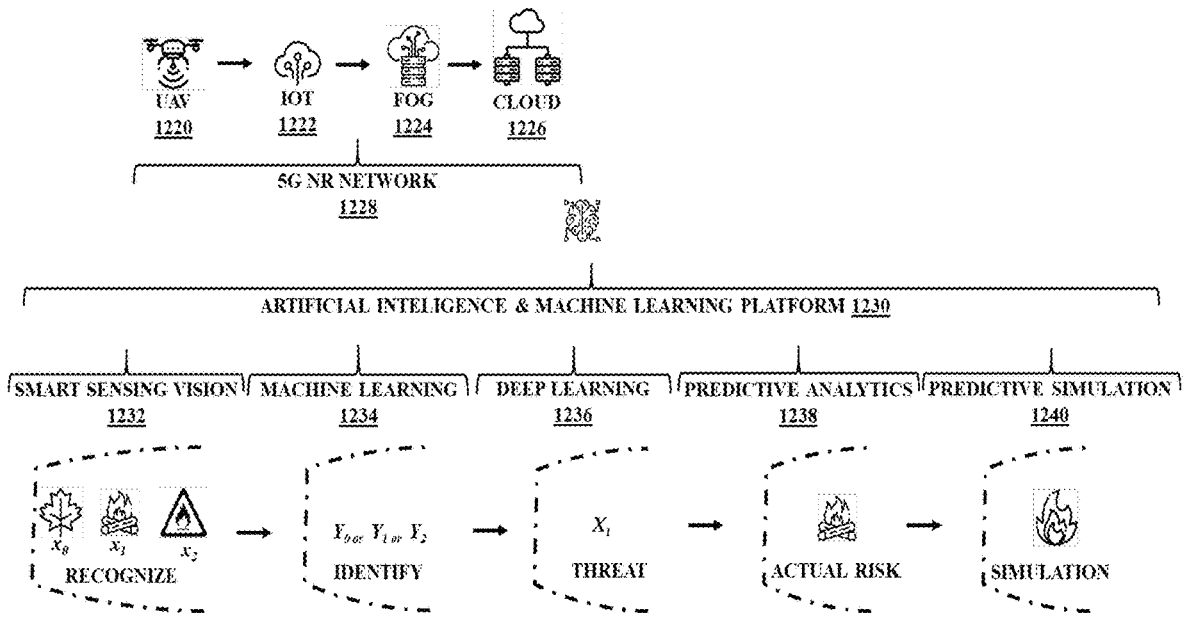
Figure 12C:
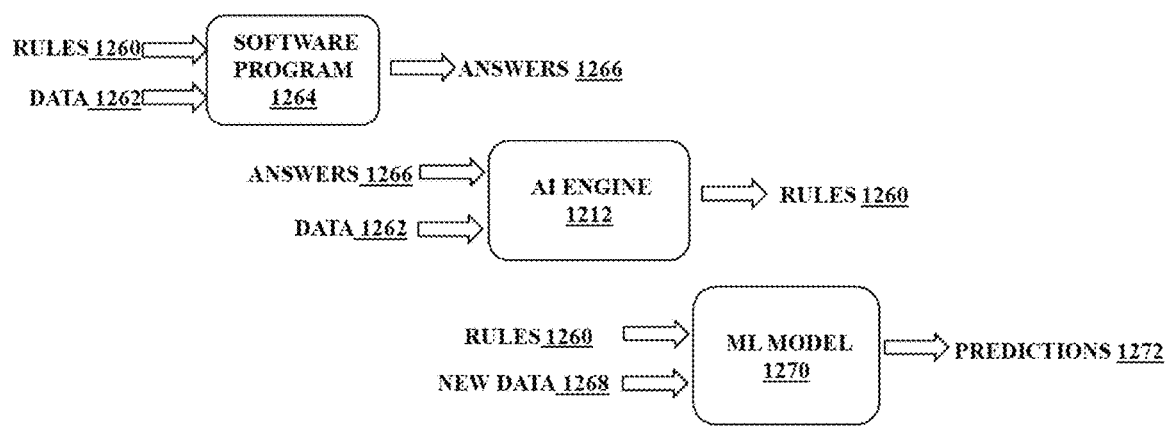

FIGS. 12A-12C illustrates use of an artificial intelligence and machine-learning platform for a smoke and fire recognition, forecasting, and monitoring system, according to one or more embodiments. In FIG. 12A, the data obtained by plurality of sensors 1200 on the plurality of self-steering unmanned aerial devices are sent via a 5G network to a single sign-on 1202 platform and relevant one or more IoT datasets 1204b are sent to the IoT engine 1204a. The edge datasets 1206a comprising one or more smoke or fire related signals are sent to artificial intelligence engine (AI engine) 1212 in the cloud 1210 by post processing of the data obtained by plurality of sensors 1200 through cloud connectors 1204. The processing of edge datasets 1206a occurs by fog computing 1206c which are connected together through fog connectors 1206b. The AI engine 1212 comprises one or more machine learning models 1212a generated from a plurality of machine learning datasets 1212b, a web tier 1212c, an application tier 1212d and a database tier 1212e. The information flow is managed through a dashboard 1216 and the graphical representation of information and data is accessible through a web and mobile display 1214. In an embodiment, an immersive technology is used to create a virtual simulation of the fire growth, direction of the spread and the speed of the growth. Input data using artificial intelligence include topology data, weather data and other geographical data to simulate the future state of the wildfire for its users. Immersive technology uses a simulated reality of the wildfire to create the feel of being in a physical world. Virtual reality is projected to the firefighters using a head-mounted display which allows them to focus on the future direction of the wildfire growth and spread without any distraction.

In another embodiment, the software interacts with the VR hardware technology to render the virtual environment and process the user input to provide dynamic, real-time response to the identified wildfire. To achieve this, software integrates components of artificial intelligence and machine learning models. This is done using the VR technology and the environment data needed to create a fully immersive environment or display a projection of the future state of the wildfire on the already existing environment the user is looking at.

In yet another embodiment, the following hardware technologies are needed to stimulate one or more wildfires to create perceptually-real sensations of the threat or situational awareness—Vision (3D Display, Head-Mounted Display, Holography), Auditory (Surround sound of a raging wildfire), Tactile (Haptic Technology or the automated simulation of touch and feel of heat), and Olfaction (Machine Olfaction or the automated simulation of the smell of smoke and wildfire). A high-performance computer system can be used for processing virtual reality complex enough to be nearly indistinguishable from everyday life and interacting with the central nervous system fast enough.

In yet another embodiment, the simulated the immersive digital environment is an artificial, interactive, computer-created scene of the current and future state of the wildfire within which a user can immerse themselves and assess the imminent threat firsthand by providing situational awareness and enable real-time decision making.

FIG. 12B provides a simplified overview of the smoke and fire recognition, forecasting, and monitoring system. The one or more physical components comprising the plurality of self-steering unmanned aerial devices 1220 (UAVs) interact with the IoT system 1222 device management system and the artificial intelligence and machine-learning platform 1230 via fog network 1224 and cloud network 1226. The data exchange between the various components of the system occurs via 5G NR network 1228. The artificial intelligence and machine-learning platform 1230 comprises smart sensing vision 1232 for recognition, machine learning 1234 for identification, deep-learning 1236 for threat detection, predictive analytics 1238 for actual risk estimation and predictive simulation 1240 for simulation to aid humans in the visualization of the possible fire growth and spread based on topography, weather, and wind conditions and other fueling factors present in the environment.

FIG. 12C depicts the comparative process of functional performance by traditional software programming 1264 and machine learning by AI engine 1212. Machine learning is an automated process in which rules 1260 are auto generated from training data 1262 and answers 1266. The rules 1260 are then compiled into a machine learning model 1270 that accepts new data 1268 to render predictions 1272.

Figure 13:
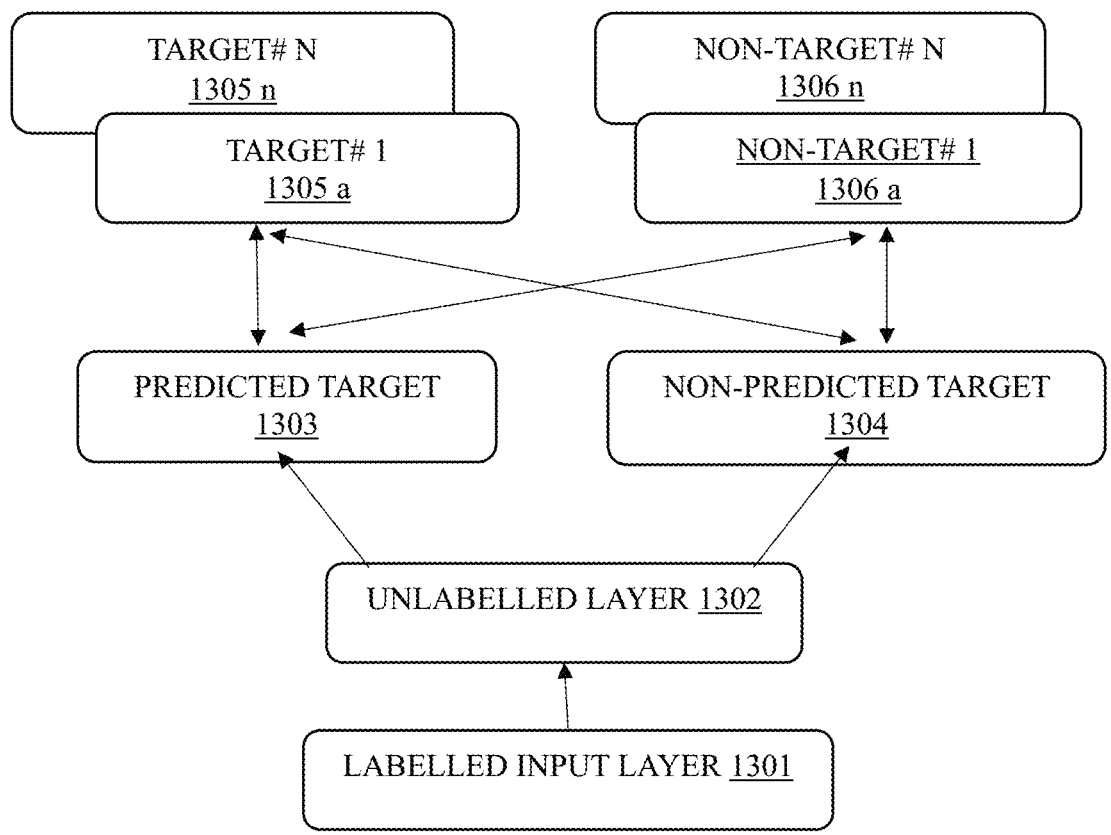
FIG. 13 illustrates the training of a deep-neural network, of a smoke and fire recognition, forecasting, and monitoring system, according to one or more embodiments.

FIG. 13 illustrates the training of the deep-neural network of a smoke and fire recognition, forecasting, and monitoring system, according to one or more embodiments. The deep-neural network is trained using labelled data 1301 and unlabeled data 1302, using machine learning, to distinguish between targets 1305 and non-targets 1306, and are tested for predicted target 1303 and non-predicted targets of fire signals 1304. In one embodiment, the deep-neural network is trained to map the one or more risk areas of the one or more regions of interest from the one or more first images of the one or more regions of interest, the one or more land related information and the one or more ambient weather related information. In another embodiment, the deep-neural network is trained to automatically recognize the one or more smoke or fire related signals from the one or more second images of the one or more risk areas and the one or more ambient weather related information. The system is capable of learning from mostly very complicated reinforcement information by analyzing vast amounts of training data based on evolutionary techniques to produce desired solutions and predictive analytics. Reinforcement deep-learning component is also programmed to learn to perform the multiple missions such as self-steering and real-time predictive analytics using automatic feature extraction and time-correlation techniques. In yet another embodiment, the deep-neural network is trained to predict the existence of fire causing smoke, fire, fire-growth and spread using the one or more second images, the one or more ambient weather related information of the one or more regions of interest, the one or more land related information. In yet another embodiment, the machine-learning or relearning is done by executing computer readable instructions and one or more machine-learning algorithms, stored on a non-transitory computer readable medium or a cloud-based artificial engine wherein one of the machine-learning algorithms comprises an evolutionary algorithm.

The following examples pertain to further embodiments. In one example of a method, the system detects a red, orange, or yellow object that does not exist in the original library of images for the same given geolocation.

Step 1: Initializing the self-steering mechanism, the plurality of self-steering unmanned aerial devices steers towards the detected object.

Step 2: The plurality of self-steering unmanned aerial devices activates the heat sensors to test for the existence of smoke and fire. The plurality of self-steering unmanned aerial devices detects heat.

Step 3: The plurality of self-steering unmanned aerial devices checks if the identified smoke and fire is static. The plurality of self-steering unmanned aerial devices detects movement.

Step 4: The plurality of self-steering unmanned aerial devices activates the audio sensors to test for the existence of the fire. The plurality of self-steering unmanned aerial devices detects audio associated with a fire.

Step 5: The plurality of self-steering unmanned aerial devices checks for wind speed and existing temperature. The plurality of self-steering unmanned aerial devices detects the existence of winds needed to fuel the fire.

Step 6: The plurality of self-steering unmanned aerial devices checks and measures the existing temperature. The plurality of self-steering unmanned aerial devices detects the existence of the needed temperature and rapid increase in surrounding temperature.

Step 7: The plurality of self-steering unmanned aerial devices is able to establish most of the needed characteristics of the start of a wildfire. The plurality of self-steering unmanned aerial devices raises an alarm to the authorities and provides situational awareness.

In one example of a method, the system detects a red, orange, or yellow object that does not exist in the original library of images for the same given geolocation.

Step 1: Initializing the self-steering mechanism, the plurality of self-steering unmanned aerial devices steers towards the detected object.

Step 2: The plurality of self-steering unmanned aerial devices activates the heat sensors to test for the existence of smoke and fire. The system does not detect heat.

Step 3: The plurality of self-steering unmanned aerial devices continues to hover around the forest to search for fires.

In one example of a method, the system detects a red, orange, or yellow object that does not exist in the original library of images for the same given geolocation.

Step 1: Initializing the self-steering mechanism, the plurality of self-steering unmanned aerial devices steers towards the detected object.

Step 2: The plurality of self-steering unmanned aerial devices activates the heat sensors to test for the existence of smoke and fire. The plurality of self-steering unmanned aerial devices detects heat.

Step 3: The plurality of self-steering unmanned aerial devices checks if the identified smoke and fire is static. The plurality of self-steering unmanned aerial devices does not detect movement.

Step 4: The plurality of self-steering unmanned aerial devices continues to hover around the forest to search for fires.

In one example of a method, the system detects a red, orange, or yellow object that does not exist in the original library of images for the same given geolocation.

Step 1: Initializing the self-steering mechanism, the plurality of self-steering unmanned aerial devices steers towards the detected object.

Step 2: The plurality of self-steering unmanned aerial devices activates the heat sensors to test for the existence of smoke and fire. The plurality of self-steering unmanned aerial devices detects heat.

Step 3: The plurality of self-steering unmanned aerial devices checks if the identified smoke and fire is static. The plurality of self-steering unmanned aerial devices detects movement.

Step 4: The plurality of self-steering unmanned aerial devices activates the audio sensors to test for the existence of the fire. The plurality of self-steering unmanned aerial devices detects audio associated with a fire.

Step 5: The plurality of self-steering unmanned aerial devices checks for wind speed and existing temperature. The system does not detect any wind.

Step 6: The server sends a signal of the existence of fire to one or more users.

Step 7: The plurality of self-steering unmanned aerial devices continues to hover around the forest to search for fires.

The foregoing disclosure provides illustration and description but is not intended to be exhaustive or to limit the implementations to the precise form disclosed. Modifications and variations are possible in light of the above disclosure or may be acquired from practice of the implementations.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. The invention may also be practiced in distributed system environments where local and remote computer systems, which are linked (either by hardwired data links, wireless data links, or by a combination of hardwired and wireless data links) through a network, both perform tasks. In a distributed system environment, program modules, units may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Although the present embodiments have been described with reference to specific example embodiments, it will be evident that various modifications and changes may be made to these embodiments without departing from the broader spirit and scope of the various embodiments. For example, the various devices, units and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a non-transitory machine-readable medium and/or a system. Accordingly, the specification and drawings are to be regarded in an illustrative rather than a restrictive sense.

INCORPORATION BY REFERENCE

All publications, patents, and patent applications cited in this Specification are hereby incorporated by reference in their entirety, including:
  US2020159397A1 entitled "Fire monitoring";
  US20200159397A1 entitled "Fire management tool with versatile user interface";
  U.S. Pat. No. 6,556,981B2 entitled "Fire detection systems and methods";
  US2012261144A1 entitled "Fire Management System";
  US20130134254A1 entitled "UAV Fire-fighting System";
  IN202011051493 entitled "An IOT based autonomous firefighting drone through machine learning";
  KR101869442B1 entitled "Fire detecting apparatus and the method thereof";
  U.S. Ser. No. 10/854,062B2 entitled "Fire monitoring system";
  US20200317338A1 entitled "Unmanned aerial vehicle, control system and method thereof, and unmanned aerial vehicle landing control method";
  US20060006997A1 entitled "Probabilistic neural network for multi-criteria fire detector";
  US20150204725A1 entitled "Multi-spectral flame detector with radiant energy estimation";
  US20050100193A1 entitled "Smoke detection method and apparatus";
  US20180018358A1 entitled "Method and apparatus for constructing a neuroscience-inspired artificial neural network with visualization of neural pathways";
  "KR20040080664A entitled "Fire detector using electronic nose sensor, in which previous alarm is easily realized";
  "U.S. Ser. No. 10/330,624B2 entitled Metal oxide gas sensor array devices, systems, and associated methods".

What is claimed is:

1. A method comprising:
   receiving, one or more first images, one or more second images, one or more ambient weather related information, data on past fire history, and one or more land related information, wherein the one or more land related information comprises vegetation features, topography, elevation, slope and aspect, of one or more regions of interest, of a geographical region;
   mapping automatically, one or more risk areas of the one or more regions of interest, from one or more first images of the one or more regions of interest;
   recognizing automatically, one or more smoke or fire related signals from the one or more second images and the one or more ambient weather related information;
   predicting automatically, existence of a fire, a fire-growth and spread based on the one or more second images, the one or more ambient weather related information of the one or more regions of interest and the one or more land related information; and
   wherein the mapping, the recognizing and the predicting is performed by at least one of a statistical analysis, a machine learning algorithm comprising a deep-neural network, an artificial intelligence platform, a rule-based analysis, and a risk-based analysis executing on a cloud-computing platform, wherein recognizing automatically, using the deep-neural network, the one or more smoke or fire related signals comprises:
   extracting, using a convolutional neural network executing on a processor operably coupled to plurality of sensors, a convolutional output;
   generating, with a non-linear regression model operably coupled to the deep-neural network, a time-series pattern representation of the one or more smoke or fire related signals;
   classifying, with a classifier operably coupled to the deep-neural network, the one or more smoke or fire related signals based on the convolutional output comprising a smoke, a flame, a spark, and an ember; and
   identifying, start of the fire by time series correlation, of the classified the one or more smoke or fire related signals and the time-series pattern representation.

2. The method of claim 1, wherein the one or more first images, the one or more second images and the one or more ambient weather related information are obtained using a plurality of self-steering unmanned aerial devices.

3. The method of claim 1, further comprises obtaining geolocation of the one or more risk areas.

4. The method of claim 1, wherein the mapping automatically, the one or more risk areas from the one or more first images comprises extracting, with the deep-neural network executing on a processor, an arid vegetation land, a semi-arid vegetation land, and an arid vegetation land with active human interference and an arid vegetation land with dry lightning.

5. The method of claim 1, wherein the one or more smoke or fire related signals comprise a smoke, a flame, a spark, an ember, a rapid rise in surface temperature, increase in surface heat and increase in $CO_2$ level.

6. The method of claim 1, further comprises annotating the one or more second images using a visual combustible object tagging tool to specify bounding boxes around edges of the one or more smoke or fire related signals.

7. The method of claim 6, wherein annotating the one or more second images comprises:
   processing, the one or more second images, through a plurality of filters comprising a horizontal line filter, a vertical line filter, and a diagonal line filter, to create map edges of the one or more smoke or fire related signals;
   performing, combustible object recognition within given scenes by slicing and indexing the one or more second images using a N-dimensional array mapping method; and
   identifying, by time-correlation analysis, cause, precise geolocation, and timestamp of start of the fire.

8. The method of claim 1, wherein the one or more first images are obtained from the one or more regions of interest of the geographical region and the one or more second images are obtained from the one or more risk areas mapped from the one or more regions of interest.

9. The method of claim 1, wherein the predicting automatically the existence of the fire, the fire-growth and spread comprises:
   extracting, one or more fire characteristics from the one or more second images, and the one or more land related information;
   predicting computationally, using the deep-neural network, the fire-growth and spread;
   providing information for situational awareness and decision making based on the fire-growth and spread prediction; and
   generating a risk mitigation report from the provided information for situational awareness and decision making and generating warning signals on possible start of the fire.

10. The method of claim 1, wherein the deep-neural network executes on the cloud-computing platform connected via a high-speed broadband internet network comprising a 5G network and a next generation WIFI network.

11. The method of claim 9, wherein extracting the one or more fire characteristics comprises extracting timestamp of start of the fire, size of the fire, rate of spread, intensity of the fire, presence of fire whirls, ember production, spotting, soil heating, temperature, heat output of surface, fuel moisture, the topography, ignition method, air temperature, wind speed, wind direction and relative humidity.

12. The method of claim 1, wherein the one or more ambient weather related information comprises wind speed, wind direction, humidity, temperature, wind pattern, lightning, and season.

13. The method of claim 1, further comprises training the deep-neural network, to automatically map the one or more risk areas of the one or more regions of interest using the one or more first images of the one or more regions of interest, the land related information, the one or more ambient weather related information, the one or more risk areas, one or more reference risk areas, and one or more mapped risk areas.

14. The method of claim 1, further comprises training the deep-neural network, to automatically recognize, the one or more smoke or fire related signals from the one or more second images of the one or more risk areas and the one or more ambient weather related information, using the one or more smoke or fire related signals, the one or more first images, the one or more second images, the one or more land related information, the one or more ambient weather related information, the one or more risk areas, one or more reference smoke related signals, one or more reference fire related signals, and one or more mapped risk areas.

15. The method of claim 1, further comprises training the deep-neural network, to automatically predict the existence of the fire, the fire-growth and spread using the one or more second images, the one or more ambient weather related information, of the one or more regions of interest, the one or more land related information, one or more reference fire characteristics and one or more reference fire spread profile.

16. The method of claim 1, further comprises machine-learning or relearning by executing one or more machine-learning algorithms, wherein one of the machine-learning algorithms comprises an evolutionary algorithm.

17. A method of claim 1, further comprising:
sending, by a plurality of self-steering unmanned aerial devices, one or more images of one or more regions of interest for a geographical region, one or more ambient weather related information, and one or more land related information, wherein the one or more land related information comprises vegetation features, topography, elevation, slope and aspect, for the geographical region, to a server, receiving, by the plurality of self-steering unmanned aerial devices a relocation instruction, from the server, of a geolocation; and sending periodically, by the plurality of self-steering unmanned aerial devices, one or more second images of the geolocation, to the server wherein the plurality of self-steering unmanned aerial devices are controlled by a ground-based controller comprising an Internet of Things (IoT) based device management system.

* * * * *